US011323852B2

(12) United States Patent
Kato et al.

(10) Patent No.: US 11,323,852 B2
(45) Date of Patent: May 3, 2022

(54) INFORMATION PROCESSING APPARATUS, INFORMATION PROCESSING METHOD, PROGRAM, AND INFORMATION PROCESSING SYSTEM FOR GENERATING NOTIFICATION INFORMATION

(71) Applicant: SONY CORPORATION, Tokyo (JP)

(72) Inventors: Ayumi Kato, Kanagawa (JP); Ikuo Yamano, Tokyo (JP); Kei Takahashi, Tokyo (JP); Kosuke Yoshitomi, Kanagawa (JP); Jun Kimura, Kanagawa (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 767 days.

(21) Appl. No.: 16/074,295

(22) PCT Filed: Jan. 13, 2017

(86) PCT No.: PCT/JP2017/000926
§ 371 (c)(1),
(2) Date: Jul. 31, 2018

(87) PCT Pub. No.: WO2017/154343
PCT Pub. Date: Sep. 14, 2017

(65) Prior Publication Data
US 2021/0195383 A1    Jun. 24, 2021

(30) Foreign Application Priority Data

Mar. 7, 2016    (JP) .............................. JP2016-043611

(51) Int. Cl.
*H04W 4/12*    (2009.01)
*H04W 4/21*    (2018.01)
(Continued)

(52) U.S. Cl.
CPC ............... *H04W 4/12* (2013.01); *H04L 51/22* (2013.01); *H04L 51/24* (2013.01); *H04W 4/023* (2013.01); *H04W 4/21* (2018.02)

(58) Field of Classification Search
CPC ..... H04L 51/00–046; H04L 51/18–38; H04W 4/12–21; H04W 4/02–029; H04W 64/00–006; H04M 2242/30
See application file for complete search history.

(56) References Cited

U.S. PATENT DOCUMENTS

| 2008/0227429 | A1* | 9/2008 | Hodgson | H04M 1/72421 455/404.2 |
| 2009/0201149 | A1* | 8/2009 | Kaji | G01S 5/0294 340/539.13 |
| 2012/0072471 | A1 | 3/2012 | Yoshida | |
| 2012/0280863 | A1* | 11/2012 | Persson | G01S 13/82 342/386 |
| 2014/0087780 | A1* | 3/2014 | Abhyanker | G06Q 50/01 455/521 |

(Continued)

FOREIGN PATENT DOCUMENTS

| CN | 1932920 A | 3/2007 |
| CN | 101146351 A | 3/2008 |

(Continued)

OTHER PUBLICATIONS

Oxford US English Dictionary online printed on Aug. 10, 2021 (Year: 2021).*

*Primary Examiner* — Ronald Eisner
(74) *Attorney, Agent, or Firm* — Paratus Law Group, PLLC

(57) ABSTRACT

There is provided an information processing apparatus, an information processing method, a program, and an information processing system capable of causing a user of a destination apparatus to be aware of arrival of delivered information without the destination apparatus communicating directly with the peripheral apparatus. The information processing apparatus includes: a notification processing unit that generates notification information for causing a user of a destination apparatus to be aware of arrival of delivered (Continued)

information, which is directed to a peripheral apparatus that is estimated to be located within a predetermined range from the destination apparatus of the delivered information on a basis of positional relationship information; and a communication unit that transmits the notification information generated by the notification processing unit.

20 Claims, 14 Drawing Sheets

(51) Int. Cl.
*H04L 51/42* (2022.01)
*H04L 51/224* (2022.01)
*H04W 4/02* (2018.01)

(56) References Cited

U.S. PATENT DOCUMENTS

2014/0335893 A1\* 11/2014 Ronen ................... H04W 4/026
455/456.1

FOREIGN PATENT DOCUMENTS

| | | | |
|---|---|---|---|
| CN | 103327089 A | | 9/2013 |
| CN | 104584511 A | | 4/2015 |
| JP | 2002-197234 A | | 7/2002 |
| JP | 2009-294829 A | | 12/2009 |
| JP | 2013-186797 A | | 9/2013 |
| JP | 2013186797 A | \* | 9/2013 |
| JP | 2015-114940 A | | 6/2015 |

\* cited by examiner

INFORMATION PROCESSING APPARATUS, INFORMATION PROCESSING METHOD, PROGRAM, AND INFORMATION PROCESSING SYSTEM FOR GENERATING NOTIFICATION INFORMATION

CROSS REFERENCE TO PRIOR APPLICATION

This application is a National Stage Patent Application of PCT International Patent Application No. PCT/JP2017/000926 (filed on Jan. 13, 2017) under 35 U.S.C. § 371, which claims priority to Japanese Patent Application No. 2016-043611 (filed on Mar. 7, 2016), which are all hereby incorporated by reference in their entirety.

TECHNICAL FIELD

The present disclosure relates to an information processing apparatus, an information processing method, a program, and an information processing system.

BACKGROUND ART

In recent years, success rates of communication have improved with the development of information communication technologies. In other words, rates at which information is lost before reaching apparatuses that are destinations of the information (hereinafter, also referred to as destination apparatuses) and the information is not received have decreased.

However, users of the destination apparatuses are not aware of the information even if the information is received by the destination apparatuses in some cases.

Meanwhile, there are technologies of causing users of the destination apparatuses to encourage others to view the information. For example, Patent Literature 1 discloses a web mail management apparatus that transmits message request information to a terminal that has performed near-field wireless communication with a reception terminal of the mail in a case in which mail that has not been opened for a predetermined period of time or longer is present.

CITATION LIST

Patent Literature

Patent Literature 1: JP 2013-186797A

DISCLOSURE OF INVENTION

Technical Problem

However, even if other apparatuses are in the surroundings of the destination apparatus of the information, the other apparatuses as described above are not notified of the arrival of the delivered information such as mail as described above according to the disclosure of Patent Literature 1. For example, a terminal that is near the reception terminal of the mail is also not a target of the notification if the terminal does not have a near-field wireless communication function. In addition, a terminal that has not performed the near-field wireless communication is still not a target of the notification even if the terminal has the near-field wireless communication function.

Thus, the present disclosure will propose a mechanism capable of causing a user of a destination apparatus to be aware of arrival of delivered information without the destination apparatus communicating directly with the peripheral apparatus.

Solution to Problem

According to the present disclosure, there is provided an information processing apparatus including: a notification processing unit that generates notification information for causing a user of a destination apparatus to be aware of arrival of delivered information, which is directed to a peripheral apparatus that is estimated to be located within a predetermined range from the destination apparatus of the delivered information on a basis of positional relationship information; and a communication unit that transmits the notification information generated by the notification processing unit.

In addition, according to the present disclosure, there is provided an information processing method including, by a processor, generating notification information for causing a user of a destination apparatus to be aware of arrival of delivered information, which is directed to a peripheral apparatus that is estimated to be located within a predetermined range from the destination apparatus of the delivered information on a basis of positional relationship information; and transmitting the generated notification information.

In addition, according to the present disclosure, there is provided a program that causes a computer to achieve: a notification processing function of generating notification information for causing a user of a destination apparatus to be aware of arrival of delivered information, which is directed to a peripheral apparatus that is estimated to be located within a predetermined range from the destination apparatus of the delivered information on a basis of positional relationship information; and a communication function of transmitting the notification information generated by the notification processing function.

In addition, according to the present disclosure, there is provided an information processing system including: a transmission source apparatus that transmits delivered information to a destination apparatus and transmits at least some of the delivered information to a server; and a server that generates notification information for causing a user of the destination apparatus to be aware of arrival of delivered information, which is directed to a peripheral apparatus that is estimated to be located within a predetermined range from the destination apparatus on a basis of positional relationship information, and transmits the generated notification information.

Advantageous Effects of Invention

According to the present disclosure, a mechanism capable of causing the user of the destination apparatus to be aware of arrival of the delivered information without the destination apparatus communicating directly with the peripheral apparatus as described above is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
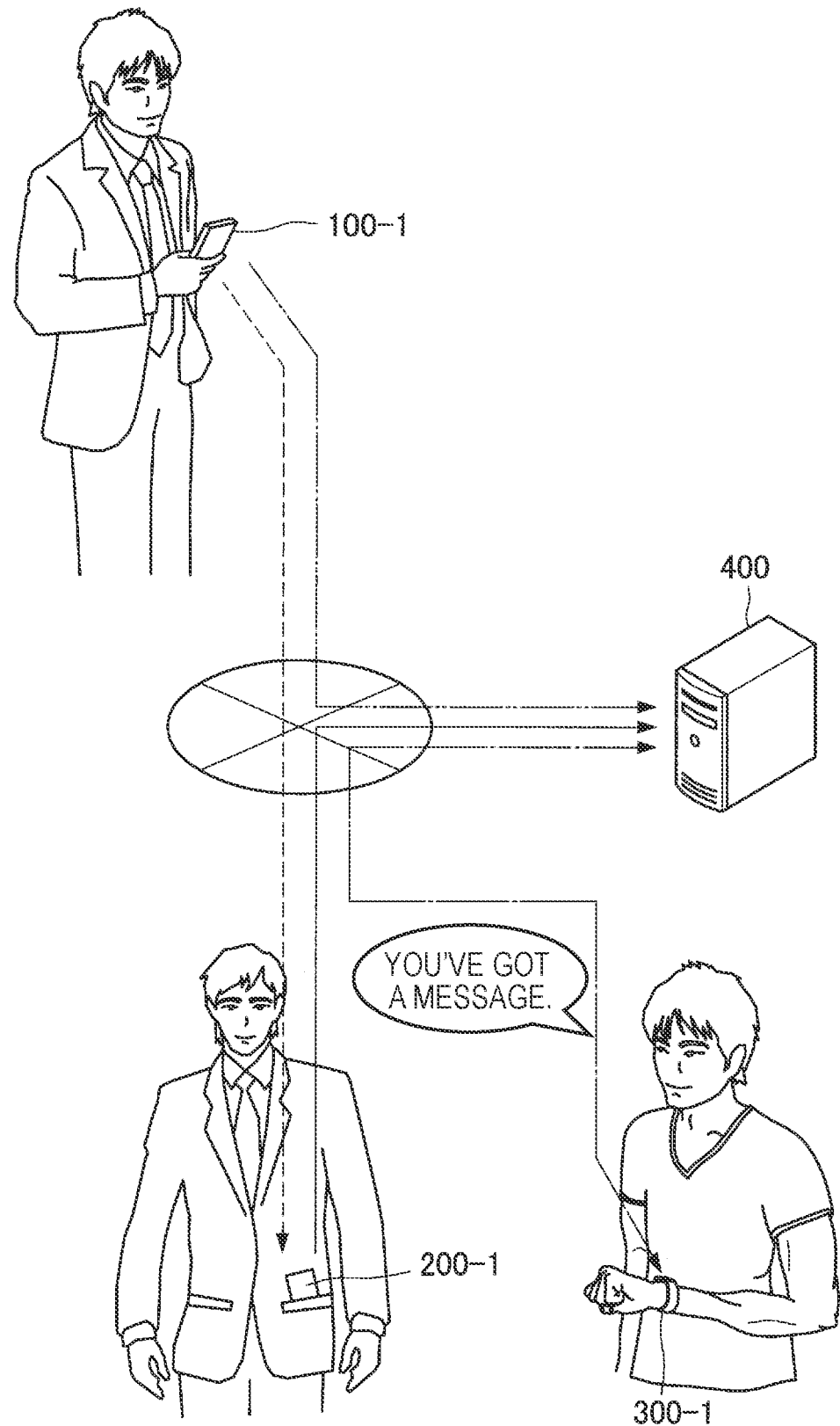
FIG. 1 is a diagram for describing an outline of an information processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, different numbers are added to ends of the same reference numerals for distinguishing a plurality of components that have substantially the same functional configurations in the specification and the drawings in some cases. For example, a plurality of configurations that have substantially the same function are distinguished as an object 20A, an object 20B, and the like as needed. However, in a case in which it is not necessary to distinguish substantially the same functional configurations, only the same reference numerals are given. For example, the object 20A and the object 20B will be simply referred to as an object 20 in a case in which it is not particularly necessary to distinguish therebetween.

In addition, transmission source apparatuses 100 according to first to third embodiments will be distinguished by adding numbers corresponding to the embodiments to the ends like transmission source apparatuses 100-1 to 100-3 for convenience of description. Note that the same is true for destination apparatuses 200 and peripheral apparatuses 300, which will be described later.

Note that description will be provided in the following order.

1. First embodiment of the present disclosure (example in which server mainly performs processing)
1-1. Outline of system
1-2. Functional configuration of system
1-3. Processing performed by system
1-4. Summary of first embodiment
1-5. Modification examples
2. Second embodiment of the present disclosure (example in which transmission source apparatus mainly performs processing)
2-1. Outline of system
2-2. Functional configuration of system
2-3. Processing performed by system
2-4. Summary of second embodiment
3. Third embodiment of the present disclosure (example in which destination apparatus mainly performs processing)
3-1. Outline of system
3-2. Functional configuration of system
3-3. Processing of system
3-4. Summary of third embodiment
4. Hardware configuration of information processing apparatus according to one embodiment of the present disclosure
5. Conclusion

1. FIRST EMBODIMENT OF THE PRESENT DISCLOSURE (EXAMPLE IN WHICH SERVER MAINLY PERFORMS PROCESSING)

First, a first embodiment of the present disclosure will be described. In the first embodiment, a user (hereinafter, also referred to as a peripheral user) of an apparatus that is in the surroundings of a destination apparatus (hereinafter, also referred to as a peripheral apparatus) is requested by a server to encourage a user (hereinafter, also referred to as a destination user) of the destination apparatus to check delivered information in a case in which the destination user is not aware of arrival of the delivered information transmitted from an apparatus that transmits the delivered information (hereinafter, also referred to as a transmission source apparatus).

1-1. Outline of System

An outline of an information processing system according to the first embodiment of the present disclosure will be described with reference to FIG. 1. FIG. 1 is a diagram for describing the outline of the information processing system according to the first embodiment of the present disclosure.

The information processing system according to the embodiment includes a transmission source apparatus 100-1, a destination apparatus 200-1, a peripheral apparatus 300-1, and a server 400. The destination apparatus 200-1 is recognized as a communication counterpart of the transmission source apparatus 100-1 while the peripheral apparatus 300-1 is not recognized as a communication counterpart of the transmission source apparatus 100-1. Therefore, communication between the transmission source apparatus 100-1 and the peripheral apparatus 300-1 is not performed. In addition, the server 400 can communicate with the transmission source apparatus 100-1, the destination apparatus 200-1, and the peripheral apparatus 300-1.

For example, the transmission source apparatus 100-1 transmits message information to the destination apparatus 200-1 as represented by the broken line in FIG. 1. The destination user who is aware of reception of the message information can view a message indicated by the message information.

Meanwhile, the destination user is not aware of the reception of the message information in some cases. In such cases, there is concern that the message information will be left until the destination user becomes aware of the reception, and when a user (hereinafter, also referred to as a transmission source user) of the transmission source apparatus 100-1 requires a reply, the transmission source user is made to wait for a long period of time.

Meanwhile, methods of encouraging a peripheral user in the surroundings of the destination user to act in such a manner that the destination user becomes aware of the message information are considered. In a case in which there is no reply to the message information, for example, the transmission source user notifies the peripheral user capable of interacting with the destination user of notification information related to a request for telling the destination user that the message information has arrived (hereinafter, also simply referred to as talking). The user who has received the notification encourages the destination user to check the received message information.

However, the aforementioned method has a requirement that the transmission source user has information that the peripheral user of the destination user has ascertained. This is because it is not possible to decide a notification counterpart of the request for talking as long as it is not possible to ascertain which of peripheral users is in the surroundings of the destination user. In addition, it is still difficult to request the peripheral user to talk if the transmission source user does not have contact information of the peripheral user even if the transmission source user has information with which the peripheral user is identified.

Thus, in the first embodiment of the present disclosure, the server 400 transmits notification information for causing the user of the destination apparatus 200-1 to be aware of the arrival of the delivered information, which is directed to the peripheral apparatus 300-1 that is estimated to be located within a predetermined range from the destination apparatus 200-1 of the delivered information on the basis of positional relationship information.

For example, the transmission source apparatus 100-1 transmits information related to message information to the server 400 as represented by the two-dotted chain line in FIG. 1 in a case in which there is no reply to message information after the message information is transmitted to the destination apparatus 200-1 as represented by the broken line in FIG. 1.

If the information related to the message information is received, the server 400 identifies the peripheral apparatus 300-1 on the basis of the position information of the destination apparatus 200-1. Note that the position information of the destination apparatus 200-1 is acquired from the destination apparatus 200-1 as represented by the solid line in FIG. 1, and the position information of the peripheral apparatus 300-1 is acquired from the peripheral apparatus 300-1 as represented by the one-dotted chain line in FIG. 1.

If the peripheral apparatus 300-1 is identified, the server 400 transmits notification information to the peripheral apparatus 300-1 as represented by the one-dotted chain line in FIG. 1. If the notification information is received by the peripheral apparatus 300-1, the user of the peripheral apparatus 300-1 encourages the destination user to check the message information as illustrated in FIG. 1 on the basis of the notification information.

In the first embodiment of the present disclosure, the server 400 transmits the notification information directed to the peripheral apparatus 300-1 that is estimated to be located within the predetermined range from the destination apparatus 200-1 of the delivered information on the basis of the positional relationship information as described above. Therefore, it is possible for the server 400 to notify the peripheral apparatus 300-1 of the request for talking even if the transmission source apparatus 100-1 does not know the presence or the contact information of the peripheral apparatus 300-1 of the destination apparatus 200-1. Therefore, it is possible to cause the user of the destination apparatus 200-1 to be aware of the arrival of the delivered information without the destination apparatus 200-1 communicating directly with the peripheral apparatus 300-1. Hereinafter, the information processing system according to the embodiment will be described in detail.

1-2. Functional Configuration of System

Figure 2:
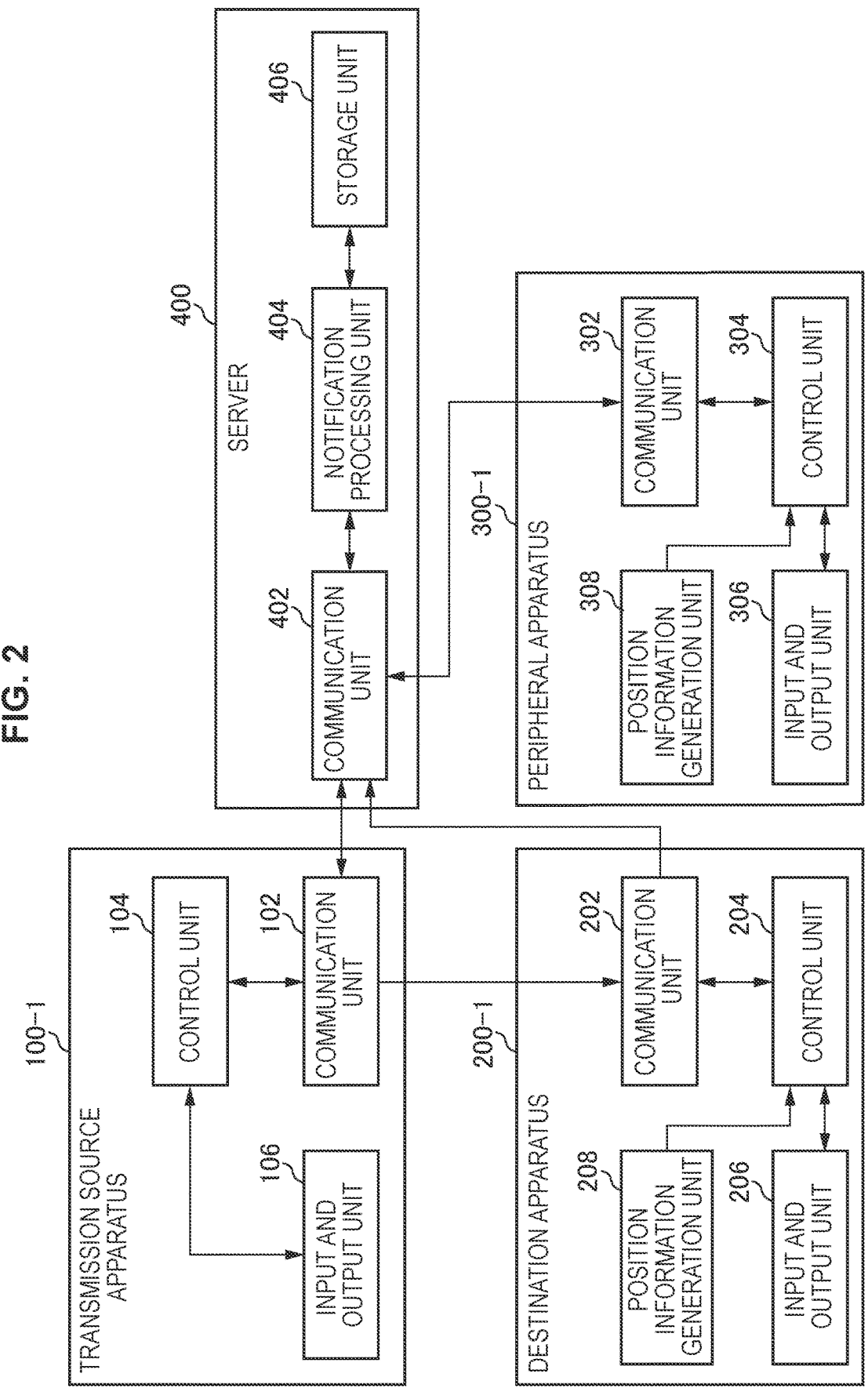
FIG. 2 is a block diagram schematically illustrating an example of a functional configuration of the information processing system according to the embodiment.

Next, a functional configuration of the information processing system according to the embodiment will be described with reference to FIG. 2. FIG. 2 is a block diagram schematically illustrating an example of the functional configuration of the information processing system according to the embodiment.

As illustrated in FIG. 2, the information processing system according to the embodiment includes the transmission source apparatus 100-1, the destination apparatus 200-1, the peripheral apparatus 300-1, and the server 400. The information processing system according to the embodiment is a system that provides a service of transmitting notification information (hereinafter, also referred to as a talking request service) to the peripheral apparatus 300-1. It is assumed that a client application for the service is installed in the transmission source apparatus 100-1, the destination apparatus 200-1, and the peripheral apparatus 300-1 while a server application for the service is installed in the server 400.

(Transmission Source Apparatus)

As illustrated in FIG. 2, the transmission source apparatus 100-1 includes a communication unit 102, a control unit 104, and an input and output unit 106. For example, the transmission source apparatus 100-1 may be a smartphone. Note that the transmission source apparatus 100-1 is not limited thereto but may be any apparatus such as a tablet terminal, a wearable terminal, a personal digital assistant (PDA), or a laptop or stationary personal computer as long as the apparatus has input and output functions and a communication function.

(Communication Unit)

The communication unit 102 communicates with the destination apparatus 200-1 and the server 400. Specifically, the communication unit 102 transmits message information that serves as delivered information to the destination apparatus 200-1. In addition, the communication unit 102 transmits the message information and selection information for the peripheral apparatus 300-1 to the server 400 and receives information related to the peripheral apparatus 300-1 and notification result information from the server 400. For example, the communication unit 102 communicates with the destination apparatus 200-1 and the server 400 by using a wireless communication scheme such as a cellular scheme.

(Control Unit)

The control unit 104 controls the overall functions of the transmission source apparatus 100-1. Specifically, the control unit 104 causes the communication unit 102 to transmit the message information to the server 400 if a predetermined period of time has elapsed after the transmission of the message information to the destination apparatus 200-1. For example, the control unit 104 notifies the user of an alert via the input and output unit 106 if the predetermined period of time has elapsed after the transmission of the message information to the destination apparatus 200-1. The user who has been notified of the alert activates the client application, and an operation for providing an instruction to execute the request for talking is input via the input and output unit 106 by using the client application. If the operation of providing an instruction to execute the request for talking is input, the control unit 104 causes the communication unit 102 to transmit information related to the message information to the server 400. The information related to the message information may have information with which at least the destination apparatus 200-1 is identified and may have other information such as text related to the message information. Note that the control unit 104 may wait until the transmission source user himself/herself performs an input indicating that the transmission source user will execute the request for talking, without performing the alert notification processing. In addition, the information related to the message information may be transmitted to the server 400 along with the transmission of the message information to the destination apparatus 200-1. In such a case, processing of determining a timing at which the request for talking is executed is performed by the server 400. In addition, the message information itself may be transmitted to the server 400.

Figure 3:
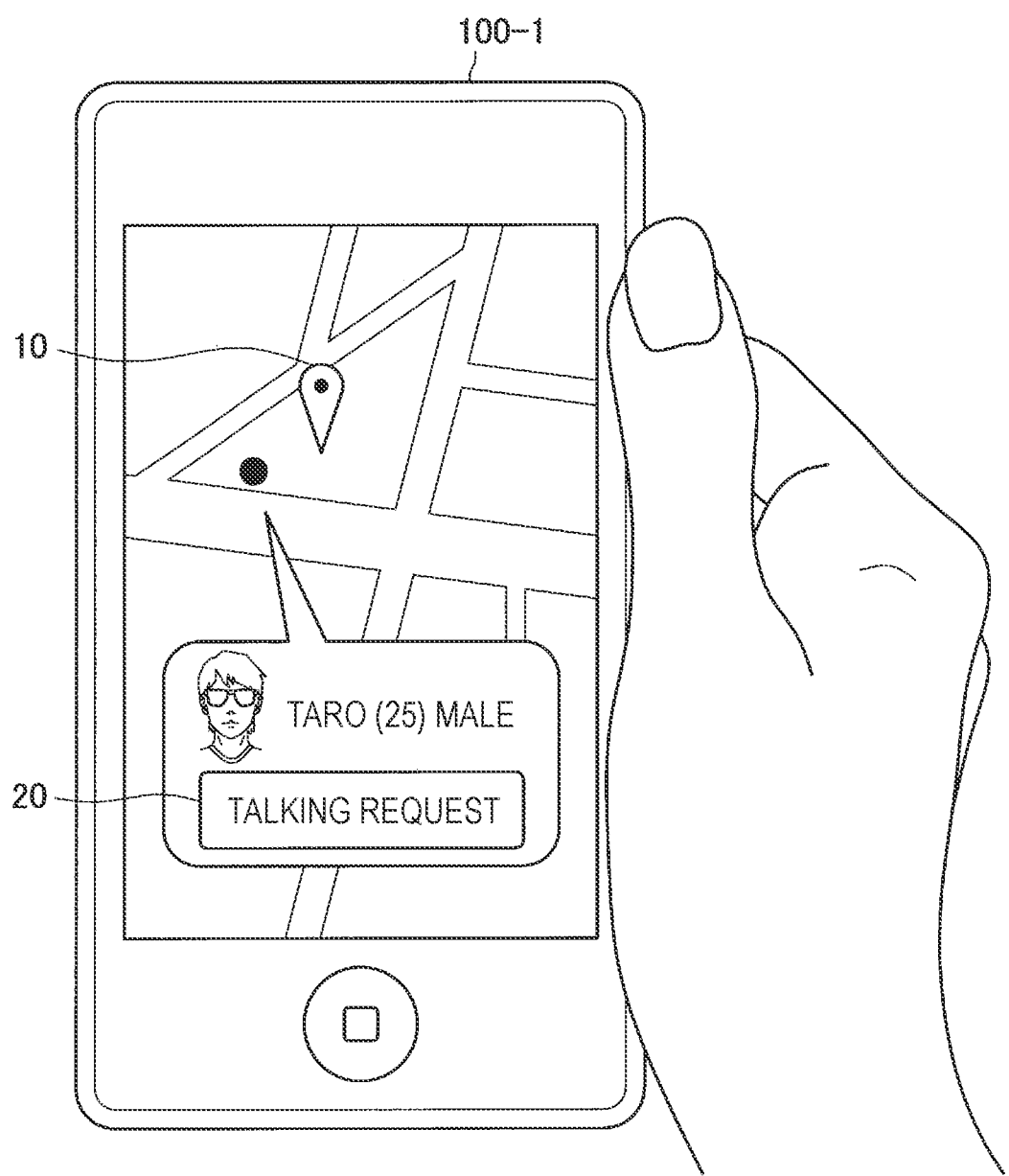
FIG. 3 is a diagram illustrating an example of information related to a peripheral apparatus, which is output from a transmission source apparatus, according to the embodiment.

Next, control related to an output from the input and output unit 106, which is performed by the control unit 104, will be described. Specifically, the control unit 104 causes the input and output unit 106 to output information. For example, the control unit 104 causes the input and output unit 106 to output the information related to the peripheral apparatus 300-1 received from the server 400. FIG. 3 is a diagram illustrating an example of the information related to the peripheral apparatus 300-1, which is output by the transmission source apparatus 100-1, according to the embodiment. If the information related to the peripheral apparatus 300-1 is received from the server 400, the control unit 104 generates image information related to a screen that has the information related to the peripheral apparatus 300-1 as illustrated in FIG. 3 and inputs the image information to the input and output unit 106. Then, the screen is displayed by the input and output unit 106 on the basis of the image information. For example, the displayed information related to the peripheral apparatus 300-1 may be attribute information of the peripheral user, such as a name, an age, a sex, and the like of the user of the peripheral apparatus 300-1. Note that it is a matter of course that the information related to the peripheral apparatus 300-1 may include different information about the user of the peripheral apparatus 300-1 and the different information may be displayed. In addition, the information related to the peripheral apparatus 300-1 may include the information about the peripheral apparatus 300-1 and information indicating the position of the peripheral apparatus 300-1 on a map as illustrated in FIG. 3, for example.

Figure 4:
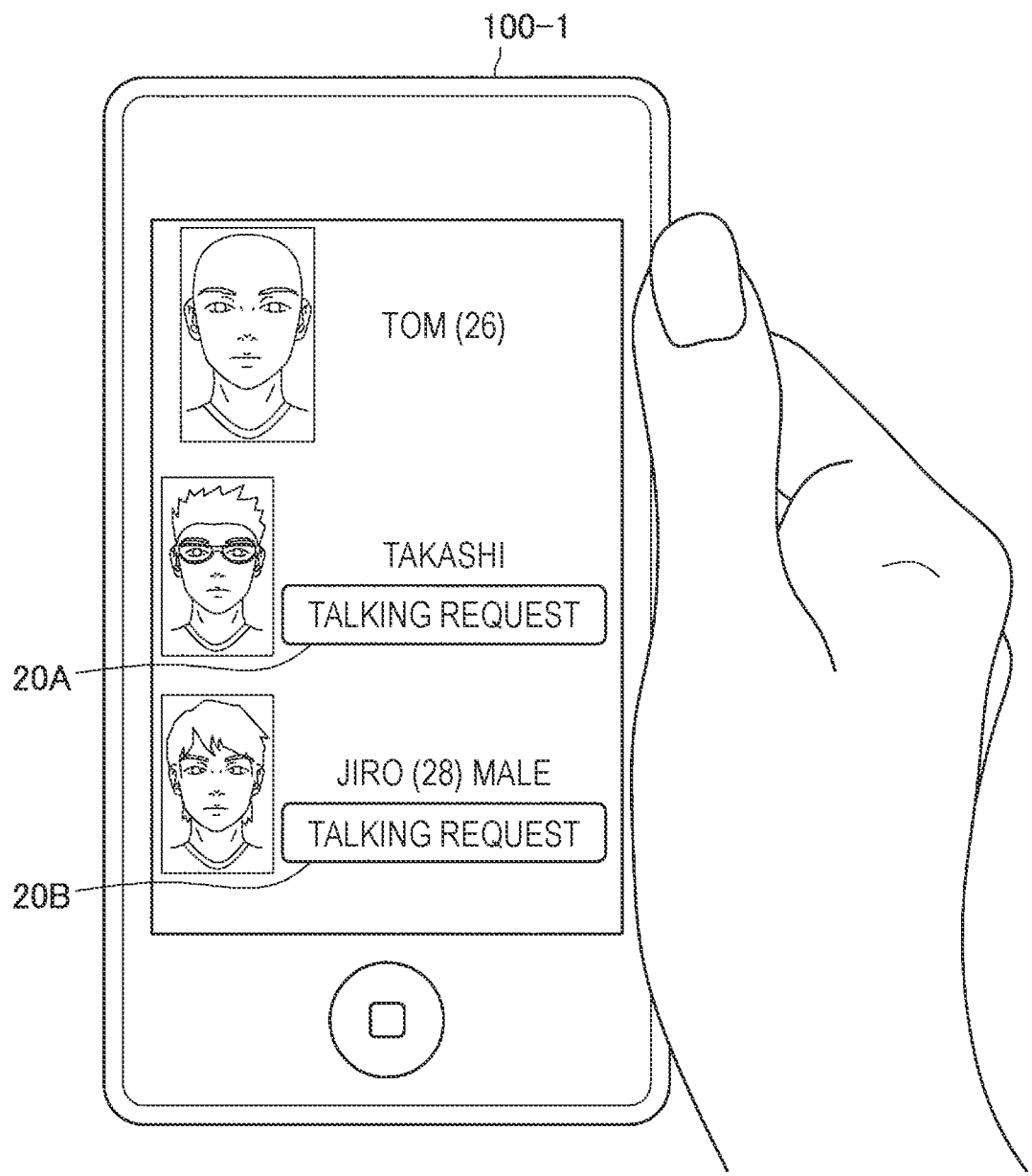
FIG. 4 is a diagram illustrating another example of information related to the peripheral apparatuses, which is output from the transmission source apparatus, according to the embodiment.

Further, information related to a plurality of peripheral apparatuses 300-1 may be output. FIG. 4 is a diagram illustrating another example of information related to the peripheral apparatuses 300-1, which is output by the transmission source apparatus 100-1, according to the embodiment. If the information related to the plurality of peripheral apparatuses 300-1 is received from the server 400, the control unit 104 causes the input and output unit 106 to display a list of the information related to the plurality of peripheral apparatuses 300-1 as illustrated in FIG. 4. Further, the control unit 104 may cause the input and output unit 106 to display the information about the destination apparatus 200-1. For example, the displayed information related to the destination apparatus 200-1 and the peripheral apparatuses 300-1 may be face images, names, ages, and sexes of the users.

Here, a part of the information related to the peripheral apparatuses 300-1 may not be revealed. This is because the peripheral users and the transmission source user are not necessarily acquainted with each other and there is concern that privacy of the peripheral users may be invaded if the information is fully revealed. For example, a range of the information related to the peripheral apparatuses 300-1 that is presented to the transmission source user is decided on the basis of relationships between the user of the transmission source apparatus 100-1 and the users of the peripheral apparatuses 300-1. In detail, the control unit 104 calculates degrees of familiarity between the users of the peripheral apparatuses 300-1 and the transmission source user for the received information related to the peripheral apparatuses 300-1. The control unit 104 decides information related to the peripheral apparatuses 300-1 to be revealed in accordance with the calculated degrees of familiarity. The degrees of familiarity are calculated in accordance with whether or not names included in the information related to the peripheral apparatuses 300-1 are present in an address list stored in the transmission source apparatus 100-1. In the example of FIG. 4, no age or sex is displayed for "Takashi."

Note that the range of revealed information related to the peripheral apparatuses 300-1 may be decided by the server 400. In this case, the control unit 104 causes the input and output unit 106 to fully output the received information related to the peripheral apparatuses 300-1. The range of the revealed information related to the peripheral apparatuses 300-1 may be set by the peripheral users.

In addition, the control unit 104 causes the input and output unit 106 to output information indicating results of the request for talking (notification result information). Specifically, the control unit 104 causes the input and output unit 106 to display the notification result information if the notification result information is received from the server 400. For example, the notification result information may be information indicating results of responses of the peripheral users, that is, whether or not the peripheral users have responded to the request for talking.

Next, control related to inputs to the input and output unit 106, which is performed by the control unit 104, will be described. The control unit 104 generates information on the basis of an input operation performed on the input and output unit 106. For example, the control unit 104 generates message information on the basis of a message generation operation performed on the input and output unit 106.

In addition, the control unit 104 selects the peripheral apparatuses 300-1 as targets of a notification on the basis of the operations performed on the transmission source apparatus 100-1. Specifically, the control unit 104 generates selection information for the peripheral apparatuses 300-1 on the basis of operations of selecting the peripheral apparatuses 300-1, which are performed on the input and output unit 106. For example, a screen that has an object 10 that indicates a position of the destination apparatus 200-1 (destination user) and information related to the peripheral apparatuses 300-1 as illustrated in FIG. 3 is displayed by the input and output unit 106. If an object 20 "request for talking" on the screen is touched, selection information for the peripheral apparatus 300-1 of the user whose name is "Taro" is generated. Also, a screen of a list of a plurality of peripheral apparatuses 300-1 as illustrated in FIG. 4, for example, may be displayed by the input and output unit 106. In this case, selection information for a peripheral apparatus 300-1 corresponding to an object 20 touched earliest may be generated, or selection information for all the touched objects 20 may be generated. Alternatively, an object configured such that selection information for all the displayed peripheral apparatuses 300-1 is generated if the object is selected may be displayed.

(Input and Output Unit)

The input and output unit 106 outputs information on the basis of an instruction from the control unit 104. Specifically, the input and output unit 106 serves as a presenting unit and presents information related to the peripheral apparatuses 300-1 to the user. For example, the input and output unit 106 displays an image related to the screen that has information related to the peripheral apparatuses 300-1, which has been generated by the control unit 104, as illustrated in FIG. 3 or 4.

In addition, the input and output unit 106 serves as a detection unit and detects an operation performed on the transmission source apparatus 100-1. Specifically, the input and output unit 106 detects a user's operation performed on the transmission source apparatus 100-1 and notifies the control unit 104 of the occurrence and the content of the detected operation. For example, the user's operation is an operation of inputting text related to the message information or an operation of selecting the object 20 as illustrated in FIG. 3 or 4.

Note that, although the input and output unit 106 has a configuration for both inputs and outputs in the examples in FIGS. 3 and 4, the input and output unit 106 may be separated into an input unit and an output unit.

(Destination Apparatus)

As illustrated in FIG. 2, the destination apparatus 200-1 includes a communication unit 202, a control unit 204, an input and output unit 206, and a position information generation unit 208. For example, the destination apparatus 200-1 may be a smartphone. Note that the destination apparatus 200-1 is not limited thereto and any apparatus may be employed as long as the apparatus has input and output functions and a communication function in a manner similar to that in the transmission source apparatus 100-1.

(Communication Unit)

The communication unit 202 communicates with the transmission source apparatus 100-1 and the server 400. Specifically, the communication unit 202 receives message information from the transmission source apparatus 100-1 and transmits position information as positional relationship information to the server 400-1.

(Control Unit)

The control unit 204 controls overall functions of the destination apparatus 200-1. Specifically, the control unit 204 controls processing of the input and output unit 206 and the position information generation unit 208. For example, the control unit 204 controls the processing of the position information generation unit 208 by setting control parameters. Note that the control unit 204 causes the communication unit 202 to transmit the position information that is generated by the position information generation unit 208.

(Input and Output Unit)

The input and output unit 206 outputs information on the basis of an instruction from the control unit 204. Specifically, the input and output unit 206 presents message information that has been received by the communication unit 202 to the destination user. For example, the input and output unit 206 displays text related to the message information. Note that information other than the text, such as an image, may be included in the message information.

In addition, the input and output unit 206 receives operations performed on the destination apparatus 200-1. Note that description of details will be omitted since they are substantially the same as those of the input and output unit 106.

(Position Information Generation Unit)

The position information generation unit 208 generates position information indicating an estimated position of the destination apparatus 200-1. Specifically, the position information generation unit 208 estimates the position of the destination apparatus 200-1 and generates the position information indicating the measured geographical position. For example, the position information may be Global Positioning System (GPS) information. Note that the position information may be relative information. For example, the position information may be information indicating a relative position with reference to a base station for mobile phones or the like or may be information estimated from a result of wireless communication using a wireless communication scheme such as Wi-Fi (registered trademark). Also, the position information maybe information indicating a landmark such as a name of a building or information indicating a name of a place.

(Peripheral Apparatus)

As illustrated in FIG. 2, each peripheral apparatus 300-1 includes a communication unit 302, a control unit 304, and an input and output unit 306. For example, the peripheral apparatus 300-1 may be a wearable terminal. Note that the peripheral apparatus 300-1 is not limited thereto and may be another apparatus such as a smartphone, a tablet terminal, a PDA, or a personal computer.

(Communication Unit)

The communication unit 302 communicates with the server 400.

Specifically, the communication unit 302 transmits position information and response information to the server 400 and receives notification information from the server 400.

Figure 5:
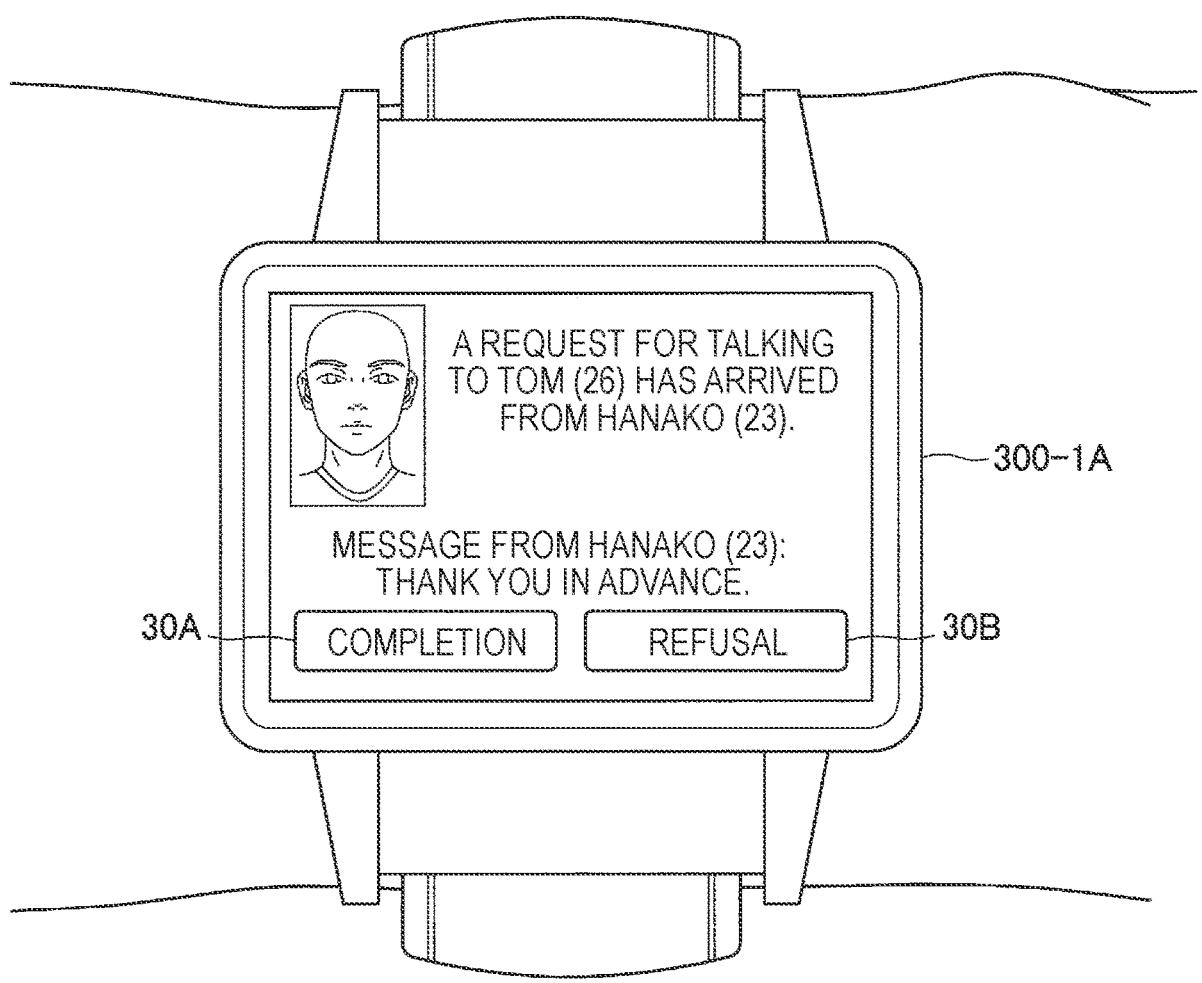
FIG. 5 is a diagram illustrating an example of notification information which is output from the peripheral apparatus according to the embodiment.

The control unit 304 controls the overall functions of the peripheral apparatus 300-1. Specifically, the control unit 304 controls processing of the input and output unit 306 and the position information generation unit 308. For example, the control unit 304 causes the input and output unit 106 to output notification information received from the server 400. FIG. 5 is a diagram illustrating an example of the notification information output from the peripheral apparatus 300-1 according to the embodiment. If the notification information is received from the server 400, the control unit 304 generates an image that indicates that the notification information has been received and has information related to the target of talking, that is, the destination user, which is included in the notification information, and the control unit 304 causes the input and output unit 306 to display the generated image. For example, the information related to the target of talking to be displayed (hereinafter, also referred to as information related to the destination user) may be a face image, a name, and an age of the destination user. Note that it is a matter of course that the information related to the target of talking may include different information about the destination user, and the different information may be displayed.

Further, information related to the transmission source user may be output. Specifically, the aforementioned notification information has information with which the transmission source user is identified and the message information. For example, the notification information has a name of the transmission source user and text related to the message information, and the control unit 304 causes the input and output unit 306 to display an image that has the name and the age of the transmission source user and the text related to the message information, which has been transmitted to the destination apparatus 200-1, as illustrated in FIG. 5.

In addition, a part of the information related to the target of talking and the information related to the transmission source user may not be revealed. This is because the peripheral users and the transmission source user are not necessarily acquainted with each other and there is a concern that privacy of the destination user or the peripheral users may be invaded if the information is fully revealed. For example, the content of the notification information to be presented to the peripheral users is decided on the basis of the attribute information of the message information. In particular, a presenting range of the information related to the target of talking or the information related to the transmission source user is decided on the basis of attributes such as a security level, a destination, or a data size of the message information. Hereinafter, an example in which the presenting range of the information is controlled on the basis of the destination of the message information will be described.

Figure 6:
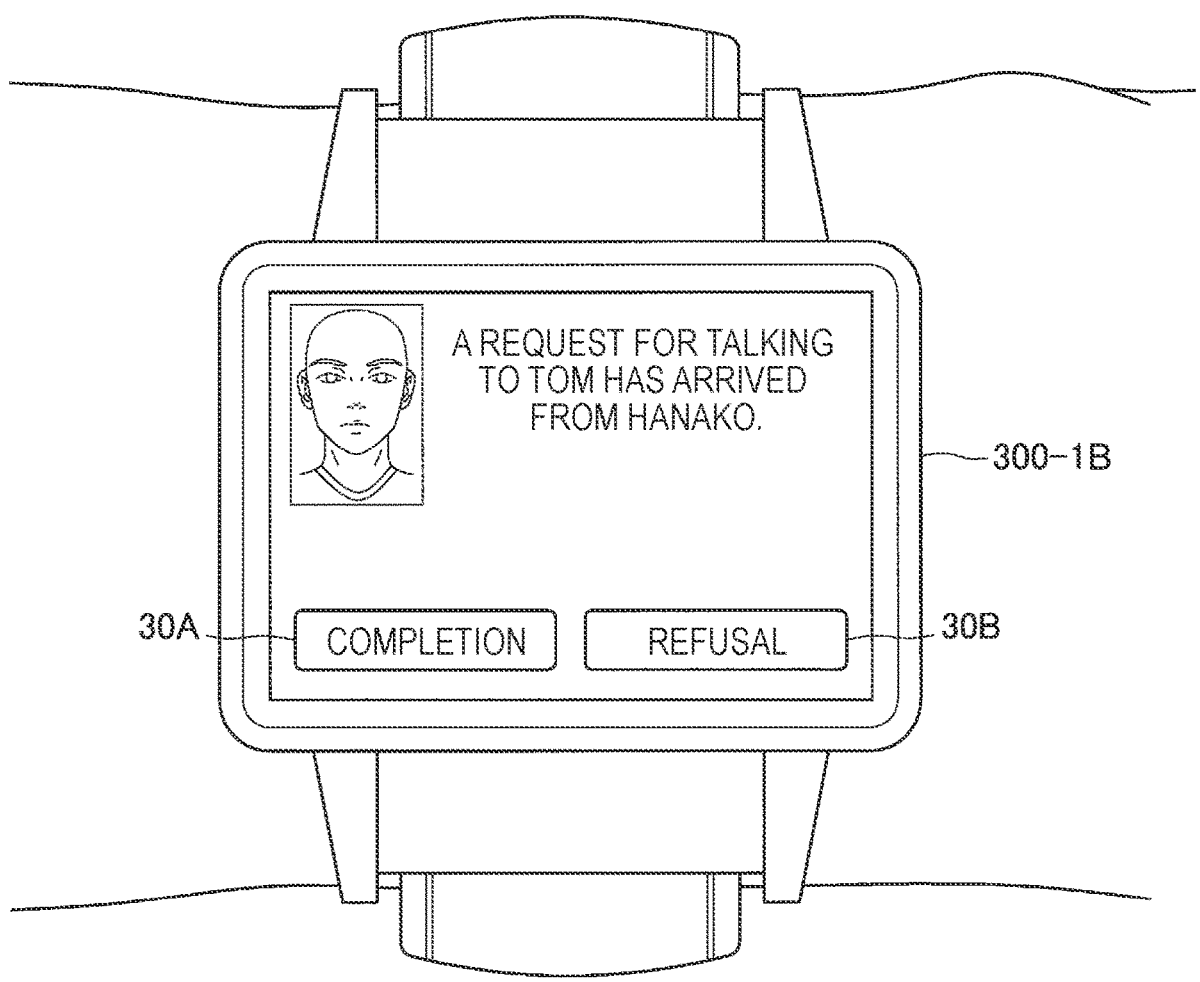
FIG. 6 is a diagram illustrating another example of notification information which is output from the peripheral apparatus according to the embodiment.

First, the control unit 304 calculates familiarity between the destination user who is the destination of the message information, that is, a target of talking for the notification information, and peripheral users. The control unit 304 decides the information related to the destination user and the information related to the transmission source user to be revealed in accordance with the calculated familiarity. The familiarity is calculated in accordance with whether or not a name of the destination user is in an address list or the like stored in the peripheral apparatus 300-1. Note that whether or not a name of the transmission source user is included may be further taken into consideration. FIG. 6 is a diagram illustrating another example of notification information output from the peripheral apparatus 300-1 according to the embodiment. In FIG. 6, a screen of a peripheral apparatus 300-1B that is different from the peripheral apparatus 300-1A as illustrated in FIG. 5 is illustrated. Since a user of the peripheral apparatus 300-1B has lower familiarity with the destination user than with the user of the peripheral apparatus 300-1A, the age of "Tom" who is the destination user and the age of "Hanako" who is the transmission source user, which are displayed for the peripheral apparatus 300-1A, are not displayed for the peripheral apparatus 300-1B, as illustrated in FIG. 6. Also, the text related to the message information transmitted by the transmission source user, which is displayed for the peripheral apparatus 300-1A, is not displayed for the peripheral apparatus 300-1B for a similar reason.

Note that a range in which the information related to the target of talking or the information related to the transmission source user is revealed may be decided by the server 400. In this case, the control unit 304 causes the input and output unit 306 to output all of the information related to the target of talking related to the received notification information or all of the information related to the transmission source user.

Also, a sentence style of the text related to the message information may be decided in accordance with the attribute information of the message information, instead of or in addition to the range in which the information is presented as described above. For example, the text is expressed with politer wording as the aforementioned familiarity decreases. In contrast, the text is expressed with more frank wording as the aforementioned familiarity increases. In this case, it is possible to cause the peripheral users to check the notification information without giving them an unpleasant feeling or an uncomfortable feeling by the expression of the text being decided in accordance with the familiarity with the peripheral users. Therefore, it is possible to reduce the concern that the peripheral users will refuse the request for talking.

In addition, information related to a response to the notification information may be output. Specifically, the aforementioned notification information has a request for responding to the notification information, and the control unit 304 causes the input and output unit 306 to display a graphical user interface (GUI) for allowing the peripheral users to select a response related to the request for responding. For example, if the notification information that has the request for responding is received, the control unit 304 causes the input and output unit 306 to display a screen that has the GUI for selecting a response to the request for talking in addition to the information related to the target of talking and the information related to the transmission source user on the basis of the notification information. Specifically, a GUI 30A that has a character string "completion" that indicates that the peripheral users accept the request for talking and a GUI 30B that has a character string "refusal" that indicates that the peripheral users refuse the request for talking are displayed as illustrated in FIGS. 5 and 6.

The control related to the outputs from the input and output unit 306 that is performed by the control unit 304 has been described above. Next, control related to inputs to the input and output unit 306 that is performed by the control unit 304 will be described. The control unit 304 generates information on the basis of an input operation performed on the input and output unit 306. Specifically, the control unit 304 generates response information to the notification information on the basis of an operation performed on the peripheral apparatus 300-1. More specifically, the control unit 304 generates the response information on the basis of a GUI selection operation performed on the input and output unit 306. In a case in which the screen including the GUIs 30A and 30B as illustrated in FIG. 5 is displayed by the input and output unit 106, for example, and if the GUI 30A on the screen is touched, response information that indicates that the peripheral users accept the request for talking is generated. Also, if the GUI 30B on the screen is touched, response information that indicates that the peripheral users refuse the request for talking is generated.

(Input and Output Unit)

The input and output unit 306 outputs information on the basis of an instruction from the control unit 304. Specifically, the input and output unit 306 presents the notification information received by the communication unit 302 and the GUI for responding to the peripheral users. For example, the input and output unit 306 displays the name of the destination user as information related to the target of talking, which is included in the notification information, and the name of the transmission source user, the text related to the message information, and the GUI for selecting a response to the request for talking as information related to the transmission source user.

In addition, the input and output unit 306 receives operations performed on the peripheral apparatuses 300-1. Note that description of details will be omitted since they are substantially the same as those of the input and output unit 106.

(Position Information Generation Unit)

The position information generation unit 308 generates position information indicating the estimated position of the peripheral apparatus 300-1. Note that description of details will be omitted since they are substantially the same as those of the position information generation unit 208.

(Server)

As illustrated in FIG. 2, the server 400 includes, as an information processing apparatus, a communication unit 402, a notification processing unit 404, and a storage unit 406. Note that the server 400 may be realized by a single apparatus or by a plurality of apparatuses.

(Communication Unit)

The communication unit 402 communicates with the transmission source apparatus 100-1, the destination apparatus 200-1, and the peripheral apparatus 300-1. Specifically, the communication unit 402 receives information related to message information and selection information of the peripheral apparatuses 300-1 from the transmission source apparatus 100-1 and transmits information related to the peripheral apparatuses 300-1 and notification result information to the transmission source apparatus 100-1. In addition, the communication unit 402 receives position information from the destination apparatus 200-1. In addition, the communication unit 402 receives position information and response information from the peripheral apparatuses 300-1 and transmits notification information to the peripheral apparatuses 300-1.

(Notification Processing Unit)

The notification processing unit 404 generates notification information on the basis of positional relationship information. Specifically, the notification processing unit 404 generates the notification information directed to a peripheral apparatus 300-1 that is estimated to be located within a predetermined range from the destination apparatus 200-1 on the basis of the position information of the destination apparatus 200-1. For example, if information related to the message information is received by the communication unit 402, the notification processing unit 404 starts to generate the notification information. Hereinafter, processing of generating the notification information will be described.

First, the notification processing unit 404 determines peripheral apparatuses 300-1 that are candidates of the destination of the notification information. In detail, the notification processing unit 404 acquires received position information of the destination apparatus 200-1 and the peripheral apparatuses 300-1 from the storage unit 406. The notification processing unit 404 determines whether or not the positions indicated by the position information of the peripheral apparatuses 300-1 (hereinafter, also referred to as the positions of the peripheral apparatuses 300-1) are within a predetermined distance range from the position indicated by the position information of the destination apparatus 200-1 (hereinafter, also referred to as the position of the destination apparatus 200-1) for the acquired position information of the peripheral apparatuses 300-1.

Next, the notification processing unit 404 causes the transmission source apparatus 100-1 to select a peripheral apparatus 300-1 that is an actual destination from among the peripheral apparatuses 300-1 determined as the candidates of the destination of the notification information. In detail, the notification processing unit 404 causes the communication unit 402 to transmit the information related to the peripheral apparatus 300-1 to the transmission source apparatus 100-1, for the peripheral apparatus 300-1 which has been determined to be within a predetermined range from the position of the destination apparatus 200-1. Then, if the selection information generated by the transmission source apparatus 100-1 is received by the communication unit 402 on the basis of the selection by the transmission source user, the notification processing unit 404 generates notification information for the peripheral apparatus 300-1 identified from the selection information. Note that the content of the notification information is decided in accordance with the attribute information of the message information as described above.

(Storage Unit)

The storage unit 406 stores information that is used for processing performed by the server 400. Specifically, the storage unit 406 stores information received from the respective apparatuses. For example, the storage unit 406 stores the information about the destination apparatus 200-1 and the peripheral apparatuses 300-1, such as the message information and the position information, and information about the transmission source user, the destination user, and the peripheral users, such as names and ages.

1-3. Processing Performed by System

Figure 7:
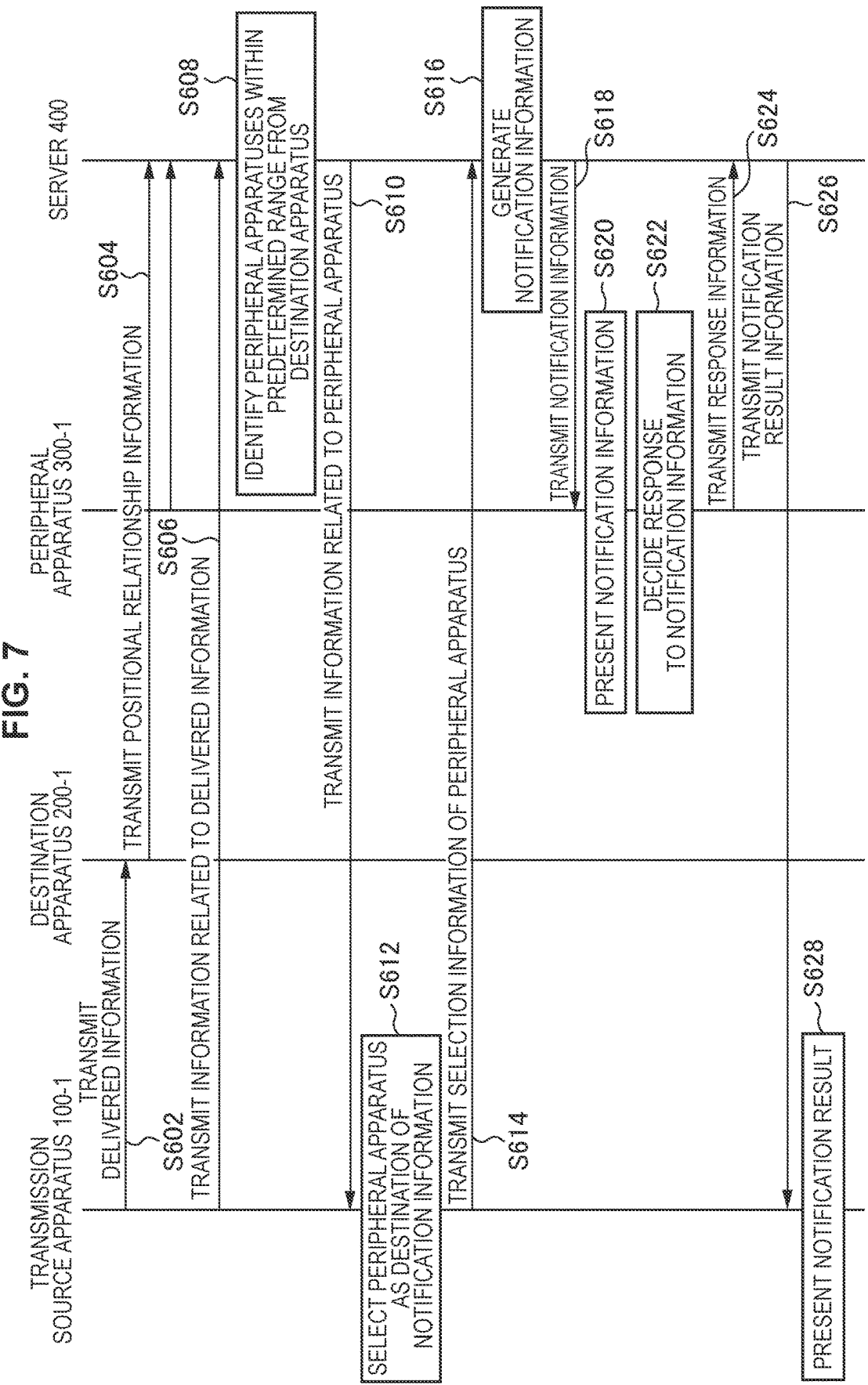
FIG. 7 is a sequence diagram conceptually illustrating an example of processing performed by the information processing system according to the embodiment.

Next, processing performed by the information processing system according to the embodiment will be described with reference to FIG. 7. FIG. 7 is a sequence diagram conceptually illustrating an example of processing performed by the information processing system according to the embodiment.

First, the transmission source apparatus 100-1 transmits delivered information to the destination apparatus 200-1 (Step S602). Specifically, if text directed to the destination user is input from the transmission source user, the control unit 104 generates message information that has the text. Then, the communication unit 102 transmits the generated message information to the destination apparatus 200-1.

In addition, the destination apparatus 200-1 and the peripheral apparatuses 300-1 transmit position information to the server 400 (Step S604). Specifically, the position information generation unit 208 (308) estimates the position of the destination apparatus 200-1 (the peripheral apparatuses 300-1) at predetermined time intervals or in accordance with occurrence of a predetermined event and generates position information that indicates the estimated position. Then, the communication unit 202 (302) transmits the generated position information to the server 400.

If a predetermined period of time has elapsed after the transmission of the delivered information to the destination apparatus 200-1, the transmission source apparatus 100-1 transmits information related to the delivered information to the server 400 (Step S606). Specifically, if a predetermined period of time has elapsed after the transmission of the message information, the control unit 104 transmits information related to the message information to the server 400 on the basis of a user's operation. Note that the control unit 104 may cause the communication unit 102 to transmit the information related to the message information to the server 400 in accordance with elapse of a predetermined period of time instead of the user's operation.

The server 400 that has received the information related to the delivered information identifies the peripheral apparatuses 300-1 within a predetermined range from the destination apparatus 200-1 (Step S608). Specifically, if the information related to the message information is received, the notification processing unit 404 specifies the destination apparatus 200-1 that is a destination of the message information from the information related to the message information. Next, the notification processing unit 404 acquires position information of the identified destination apparatus 200-1 from the storage unit 406 and identifies the peripheral apparatuses 300-1 that are present within a predetermined range from the position of the destination apparatus 200-1 on the basis of the position information.

The server 400 that has received the information related to the delivered information transmits the information related to the peripheral apparatuses 300-1 to the transmission source apparatus 100-1 (Step S610). Specifically, the notification processing unit 404 acquires the information related to the identified peripheral apparatuses 300-1 from the storage unit 124 and causes the communication unit 402 to transmit the acquired information to the transmission source apparatus 100-1.

The transmission source apparatus 100-1 that has received the information related to the peripheral apparatuses 300-1 selects a peripheral apparatus 300-1 as a destination of the notification information (Step S612). Specifically, the control unit 104 causes the input and output unit 106 to display the received information related to the peripheral apparatuses 300-1. Next, the control unit 104 selects the peripheral apparatus 300-1 as a destination of the notification information on the basis of a selection operation input to the input and output unit 106. Then, the control unit 104 generates selection information indicating the peripheral apparatus 300-1 selected as the destination of the notification information.

Next, the transmission source apparatus 100-1 transmits the selection information of the peripheral apparatus 300-1 to the server 400 (Step S614). Specifically, the control unit 104 causes the communication unit 102 to transmit the generated selection information to the server 400.

The server 400 that has received the selection information of the peripheral apparatus 300-1 generates notification information (Step S616). Specifically, if the selection information is received, the notification processing unit 404 generates notification information directed to the peripheral apparatus 300-1 indicated by the selection information on the basis of the attribute information of the message information. Note that the content of the generated notification information may differ depending on the peripheral apparatus 300-1 as a destination of the notification information.

Next, the server 400 transmits the notification information to the peripheral apparatus 300-1 (Step S618). Specifically, the communication unit 402 transmits the generated notification information to the peripheral apparatus 300-1.

The peripheral apparatus 300-1 that has received the notification information presents the notification information to the peripheral users (Step S620). Specifically, if the notification information is received, the control unit 304 causes the input and output unit 306 to display a GUI for selecting content of the notification information and a response.

Next, the peripheral apparatus 300-1 decides a response to the notification information (Step S622). Specifically, if an operation by a peripheral user is input by using the GUI for selecting a response, the control unit 304 generates response information on the basis of the operation.

Next, the peripheral apparatus 300-1 transmits the response information to the server 400 (Step S624). Specifically, the communication unit 302 transmits the generated response information to the server 400.

The server 400 that has received the response information transmits notification result information to the transmission source apparatus 100-1 (Step S626). Specifically, if the response information is received, the notification processing unit 404 generates notification result information in accordance with the response information. Then, the communication unit 402 transmits the generated notification result information to the transmission source apparatus 100-1. Note that the response information may be transmitted to the transmission source apparatus 100-1 without any change instead of the notification result information.

The transmission source apparatus 100-1 that has received the notification result information presents the notification result to the transmission source user (Step S628). Specifically, if the notification result information is received, the control unit 104 causes the input and output unit 106 to display the notification result information.

1-4. Conclusion of First Embodiment

According to the first embodiment of the present disclosure, the server 400 transmits notification information for causing the user of the destination apparatus 200-1 to be aware of arrival of delivered information directed to the peripheral apparatus 300-1, which is estimated to be located within a predetermined range from the destination apparatus 200-1 of the delivered information on the basis of the positional relationship information. Therefore, it is possible to transmit the notification information from the server 400 to the peripheral apparatus 300-1 without mediation of the destination apparatus 200-1. Also, it is possible to request the peripheral apparatus 300-1 to talk even if the transmission source apparatus 100-1 does not ascertain the contact information of the peripheral apparatus 300-1 since the notification is transmitted from the server 400. Therefore, it is possible to cause the user of the destination apparatus 200-1 to be aware of the arrival of the delivered information without the destination apparatus 200-1 communicating directly with the peripheral apparatus 300-1.

In addition, the aforementioned delivered information includes the message information. Here, the user is generally notified of the arrival of the message information such as an email by the apparatus using sound, vibration, or the like. However, a time during which the notification is continued is shorter than that for calling or the like for a phone call in many cases, and the user tends not be aware of the notification. Thus, it is possible to suppress leaving of the received message information by setting the message information as a target of the talking request service.

Also, the aforementioned positional relationship information includes position information related to the estimated positions of the destination apparatus 200-1 and the peripheral apparatuses 300-1. Therefore, it is possible to transmit the notification information to the peripheral apparatuses 300-1 that are located at geographically close positions from the destination apparatus 200-1. Therefore, it is possible to suppress the concern that a peripheral user, for whom it is difficult to talk to the destination user, is selected.

In addition, the aforementioned notification information may have at least a part of the information related to the user of the destination apparatus 200-1 or the aforementioned delivered information. Therefore, it is possible to allow the peripheral users to ascertain the destination user to talk to.

Therefore, it is possible to suppress the concern that the peripheral users fail to choose the destination user to talk to. Further, in a case in which the notification information has the content of the delivered information, the destination user can ascertain an outline of the content of the delivered information before checking the delivered information. Therefore, the destination user can omit a task of checking the delivered information.

In addition, the content of the aforementioned notification information is decided on the basis of the attribute information of the aforementioned delivered information. Therefore, it is possible to appropriately control the content of the notification information to be disclosed to the peripheral users. Therefore, it is possible to protect privacy of the destination user and the transmission source user.

In addition, the aforementioned notification information has a response request to the notification information, and the server 400 receives a response based on the response request. Therefore, it is possible for the transmission source user to know whether talking has been performed in response to the talking request by the notification information. Therefore, it is possible to suppress the transmission source user from issuing the talking request many times in a case in which there is no response to the delivered information from the destination user. In contrast, it is also possible to request another peripheral user to talk by ascertaining the fact that the talking has not been performed in a case in winch the transmission source user desires to allow the destination user to check the delivered information early.

In addition, the destination of the aforementioned notification information includes some the peripheral apparatuses 300-1 selected from the plurality of peripheral apparatuses 300-1. Therefore, it is possible to suppress the destination user from being talked in an overlapped manner by notifying only the part of the peripheral users from among the peripheral users as the candidates of the talking request. Therefore, it is possible to suppress the destination user from feeling that the talking is annoying and to suppress unnecessary behaviors of the peripheral users. In addition, it is possible to suppress the notification information from being distributed by the notification information being transmitted only to the peripheral users suitable for talking to the destination user. Therefore, it is possible to protect the privacy of the destination user (and also the privacy of the transmission source user in a case in which the notification information has information related to the transmission source user).

In addition, the transmission source apparatus 100-1 detects an operation performed on the transmission source apparatus 100-1, and the aforementioned part of the peripheral apparatuses 300-1 is selected on the basis of the detected operation. Therefore, it is possible for the transmission source user to select a peripheral user as a target of the talking request. Therefore, it is possible to effectively suppress a concern that the privacy may be be invaded by the range in which the information related to the privacy is revealed being decided by the transmission source user.

In addition, the transmission source apparatus 100-1 presents the information related to the peripheral apparatuses 300-1 to the user of the transmission source apparatus 100-1. Therefore, it is possible for the transmission source user to appropriately make a selection from the peripheral users by the information related to the peripheral users who are the candidates of the destination of the notification information being presented to the transmission source user. Therefore, it is possible to suppress the information related to the privacy from being erroneously revealed.

In addition, the range of the information related to the peripheral apparatus 300-1 that is presented to the user of the transmission source apparatus 100-1 is decided on the basis of the relationships between the user of the transmission source apparatus 100-1 and the users of the peripheral apparatuses 300-1. Therefore, it is possible to reduce complexity of the operation of selecting the peripheral user by the peripheral users as the candidates of the destination represented to the transmission source user being narrowed down on the basis of familiarity or the like. The configuration is effective especially in a case in which multiple peripheral users are candidates of the destination.

In addition, the aforementioned notification information is transmitted a predetermined time after the transmission of the aforementioned delivered information. Therefore, it is possible to transmit the notification information only in a case in which it is estimated that the destination user has not been aware of the delivered information. Therefore, it is possible to prevent the notification information from being excessively transmitted.

1-5. Modification Examples

The first embodiment of the present disclosure has been described above.

Note that the embodiment is not limited to the aforementioned example.

Hereinafter, first to fourth modification examples of the embodiment will be described.

First Modification Example

In a first modification example of the embodiment, the delivered information may be calling information for a phone call. Specifically, the transmission source apparatus 100-1 calls the destination apparatus 200-1 for a phone call.

Here, in a case in which the destination apparatus 200-1 answers the calling, the talks are just conducted. However, in a case in which the destination apparatus 200-1 does not answer the calling, the calling is continued. If the calling is ended, then information that indicates that the calling has been conducted (hereinafter, also referred to as arriving information) is recorded in the destination apparatus 200-1. The user of the destination apparatus 200-1 can recognize that there has been arrival from the transmission source user by referring to the arriving information and call back to the transmission source user. Thus, the server 400 transmits the notification information to the peripheral apparatus 300-1 of the destination apparatus 200-1 that is a target of calling for the information used in the calling for a phone call (calling information) in the modification example.

Specifically, the transmission source apparatus 100-1 calls the destination apparatus 200-1 for a phone call first. For example, the control unit 104 causes the communication unit 102 to perform communication related to the calling to the destination apparatus 200-1 on the basis of a user's operation for a phone call. In a case if the phone call are failed, the transmission source apparatus 100-1 transmits the calling information to the server 400 on the basis of a user's operation. In a case in which the destination apparatus 200-1 does not answer the communication related to the calling, for example, the control unit 104 allows the user to select whether or not to request the peripheral user to talk to the user of the destination apparatus 200-1, via the input and output unit 106. If the user selects to perform talking request, the control unit 104 causes the communication unit 102 to transmit calling information related to the calling to the server 400.

The server 400 that has received the calling information transmits information related to the peripheral apparatuses 300-1 of the destination apparatus 200-1 as the destination of the calling to the transmission source apparatus 100-1. For example, the notification processing unit 404 identifies the destination apparatus 200-1 as the destination of calling from the calling information and identifies the peripheral apparatuses 300-1 that are present in a predetermined range from the destination apparatus 200-1 on the basis of the position information of the identified destination apparatus 200-1. Then, the notification processing unit 404 causes the communication unit 402 to transmit information related to the identified peripheral apparatuses 300-1 to the transmission source apparatus 100-1. Note that description of the following processing will be omitted since the it is substantially the same as the processing according to the first embodiment.

According to the first modification example of the embodiment, the delivered information includes the calling information for a phone call as described above. Here, in a case in which a phone call is used for making a contact with the destination user, it is desirable that the contact have to be made emergently or it is desirable that the contact with the destination user be made reliably in many cases. Thus, even in a case in which such a phone call is failed, it is possible for the transmission source user to more reliably make a phone call to the destination user by the fact that there has been arrival being delivered to the destination user by the surrounding user according to the modification example. Therefore, it is possible to suppress a decrease in immediacy that the phone call function has.

Second Modification Example

In a second modification example of the embodiment, the server 400 may estimate the positions of the destination apparatus 200-1 and the peripheral apparatuses 300-1. Specifically, the notification processing unit 404 estimates the positions of the destination apparatus 200-1 and the peripheral apparatuses 300-1 from movement histories of the destination apparatus 200-1 and the peripheral apparatuses 300-1. For example, if information related to the delivered information (in other words, a request for executing the talking service) is received from the transmission source apparatus 100-1, the notification processing unit 404 estimates the position of the destination apparatus 200-1 at the current point on the basis of a change in the position information of the destination apparatus 200-1 in the past. I detail, the position at the current point is estimated on the basis of a position up to a timing tracking back by a predetermined period of time from the current point and a movement speed. Similarly, the notification processing unit 404 estimates the positions of the peripheral apparatuses 300-1 on the basis of changes in the position information in the past. Then, the notification processing unit 404 identifies the peripheral apparatuses 300-1 as candidates of the destination by using the position information related to the estimated positions.

In addition, if the information related to the delivered information is received from the transmission source apparatus 100-1, for example, the notification processing unit 404 estimates the position of the destination apparatus 200-1 at the current point on the basis of tendency of the position of the destination apparatus 200-1, which is ascertained from the position information in the past. In detail, a position at which the destination apparatus 200-1 is determined to be located at the current point with a higher probability than those at any other positions on the basis of the tendency of the positions that the destination apparatus 200-1 has been present in each time zone, which is ascertained from the position information in the past, is estimated as the position of the destination apparatus 200-1 at the current point. Similarly, the notification processing unit 404 estimates the positions of the peripheral apparatuses 30-1 at the current point on the basis of the tendency of the positions of the peripheral apparatuses 300-1, which is ascertained from the position information in the past. Then, the notification processing unit 404 identifies the peripheral apparatuses 300-1 as candidates of the destination by using the position information related to the estimated positions.

According to the second modification example of the embodiment, the position information includes the position information estimated form the movement histories of the apparatuses as described above. Therefore, it is possible to transmit the notification information to the appropriate peripheral apparatuses 300-1 without acquiring the position information from the destination apparatus 200-1 and the peripheral apparatus 300-1 every time the notification information is transmitted. Therefore, it is possible to reduce power consumption and processing loads of the respective apparatuses by the communication processing of the destination apparatus 200-1 and the peripheral apparatuses 300-1 being reduced. In addition, it is also possible to shorten a time required for transmitting the notification information by communication for acquiring the position information being omitted.

Third Modification Example

In a third modification example of the embodiment, the peripheral apparatuses 300-1 as destinations of the notification information may be decided without using the position of the destination apparatus 200-1. Specifically, the positional relationship information includes information with which the peripheral apparatus 300-1 that stays together with the user of the destination apparatus 200-1 is identified (hereinafter, also referred to as accompanying apparatus information), and the server 400 decides the peripheral apparatuses 300-1 as candidates of the destination on the basis of the accompanying information.

For example, the destination apparatus 200-1 or the peripheral apparatus 300-1 transmits the accompanying information to the server 400. In detail, the control unit 204 generates accompanying information for the peripheral user on the basis of an operation of inputting information with which the peripheral user who stays together is identified. As the information with which the peripheral user is identified, a name of the peripheral user, a nickname, an image in which the face of the peripheral user appears, or the like is exemplified. Then, the control unit 204 transmits the generated accompanying information to the server 400. Similarly, the accompanying information is also generated by the peripheral apparatus 300-1, and the generated accompanying information is transmitted to the server 400. Note that a user operation related to the aforementioned series of processing is performed as an operation of posting information, for example.

If information related to the delivered information is received from the transmission source apparatus 100-1, the server 400 that has received the accompanying information identifies the accompanying information related to the destination apparatus 200-1 identified from the information related to the delivered information. In detail, the notification processing unit 404 identifies the destination apparatus 200-1 from the received information related to the delivered information. In a case in which the accompanying information of the identified destination apparatus 200-1 is stored in the storage unit 406, the notification processing unit 404 acquires the accompanying information. Also, in a case in which the accompanying information of the identified destination apparatus 200-1 is not stored in the storage unit 406, the notification processing unit 404 searches for accompanying information of another apparatus, with which the destination apparatus 200-1 is identified. If the accompanying information of another apparatus, with which the destination apparatus 200-1 is identified, is discovered, the notification processing unit 404 acquires the discovered accompanying information.

Next, the server 400 transmits the information related to the peripheral apparatuses 300-1 identified from the accompanying information to the transmission source apparatus 100-1. In detail, the notification processing unit 404 identifies the peripheral apparatuses 300-1 for the aforementioned destination apparatus 200-1 from the acquired accompanying information. The notification processing unit 404 generates information related to the peripheral apparatuses 300-1 as the peripheral apparatuses 300-1 by regarding the identified peripheral apparatuses 300-1 as the peripheral apparatuses 300-1 as the candidates of the destination. Then, the communication unit 402 transmits the generated information related to the peripheral apparatus 300-1 to the transmission source apparatus 100-1. Description of the following processing will be omitted since it is substantially the same as the processing according to the first embodiment.

Note that a plurality of accompanying information items may be transmitted for the same apparatus. For example, the accompanying information may be transmitted from the same peripheral apparatus 300-1 at a plurality of different clock times. In this case, the notification processing unit 404 uses accompanying information received at the latest reception clock time as compared with any other accompanying information for the processing.

In addition, although the example in which the accompanying information transmitted to the server 400 is used has been described above, accompanying information accumulated in another apparatus or accompanying information for another service may be utilized. For example, the accompanying information may be information posted in a service such as a social networking site (SNS). In this case, the server 400 acquires the accompanying information accumulated in another apparatus or for another service and uses the acquired accompanying information for the processing.

According to the third modification example of the embodiment, the positional relationship information includes information with which the peripheral apparatus 300-1 that stays with the user of the destination apparatus 200-1 is identified as described above. Therefore, it is possible to transmit the notification information to the appropriate peripheral apparatus 300-1 for the destination apparatus 200-1 without the position information of the destination apparatus 200-1. Here, the peripheral user that stays with the destination user tends to be familiar with the destination user with a higher possibility. Therefore, the peripheral user identified on the basis of the accompanying information is considered to easily respond to the talking request. Therefore, it is possible to make the selected peripheral apparatus 300-1 appropriate.

In addition, it is possible to apply the modification example to a case in which the destination user does not bring the destination apparatus 200-1 with him/her by the position information of the destination apparatus 200-1 being not used. In this case, the notification information is used as information for delivering the delivered information to the destination user rather than as information for causing the destination user to be aware of the arrival of the delivered information. That is, the notification information includes the delivered information.

Fourth Modification Example

In a fourth modification example of the embodiment, the notification information may be automatically transmitted to the peripheral apparatuses 300-1. Specifically, the server 400 selects the peripheral apparatuses 300-1 on the basis of the information related to the peripheral apparatuses 300-1 without transmitting the information related to the peripheral apparatuses 300-1 to the transmission source apparatus 100-1 and transmits the notification information to the selected peripheral apparatus 300-1.

For example, if the information related to the delivered information is received from the transmission source apparatus 100-1, the notification processing unit 404 identifies the peripheral apparatuses 300-1 as candidates of the destination from the position information or the like of the destination apparatus 200-1 identified from the information related to the delivered information.

Next, the notification processing unit 404 decides the peripheral apparatus 300-1 as a destination of the notification information on the basis of the information about the users of the peripheral apparatuses 300-1 as the identified candidates of the destination. In detail, the notification processing unit 404 decides the peripheral apparatus 300-1 as a candidate of the destination, the user of which has familiarity that is higher than a threshold value with the destination user, as a peripheral apparatus 300-1 as the destination of the notification information. Note that the information for calculating the familiarity may be acquired from the respective apparatuses in advance or may be calculated on the basis of the accompanying information as described above.

Then, the notification processing unit 404 generates notification information for the decided peripheral apparatus 300-1, and the generated notification information is transmitted to the decided peripheral apparatus 300-1.

Also, the peripheral apparatus 300-1 as the destination of the notification information may be decided on the basis of the information about the peripheral apparatuses 300-1 as the candidates of the destination. For example, the information of the peripheral apparatuses 300-1 may be electric power information. In detail, the notification processing unit 404 decides a peripheral apparatus 300-1 as a candidate of the destination, a battery remaining amount of which is larger than a threshold value, as a peripheral apparatus 300-1 as the destination of the notification information. Note that the electric power information may be acquired from the respective apparatuses in advance or may be calculated on the basis of a transmission frequency of the notification information or the like.

In addition, the information about the peripheral apparatuses 300-1 may be apparatus type information, for example. In detail, the notification processing unit 404 decides a peripheral apparatus 300-1 as a candidate of the destination, the type of which is an apparatus that is attached to a body, such as a wearable terminal, as a peripheral apparatus 300-1 as the destination of the notification information. Note that the apparatus type information may be acquired from the respective apparatuses in advance. In particular, it is possible for the peripheral users to be easily aware of the reception of the notification information by setting the wearable terminal as the destination of the notification information with priority. For example, it is possible to increase the possibility that the peripheral users are aware of the reception of the notification information by the wearable terminal outputting tactile vibration in response to the reception of the notification information.

According to the fourth modification example of the embodiment, the destination of the notification information is selected on the basis of the information related to the peripheral apparatuses 300-1 as described above. Therefore, it is possible to transmit the notification information to the appropriate peripheral apparatus 300-1 without the transmission source user having to select the peripheral users. Therefore, it is possible to save the time and effort for the operation performed by the transmission source user and to reduce a burden on the transmission source user.

In addition, the aforementioned information related to the peripheral apparatuses 300-1 includes information about the users of the peripheral apparatuses 300-1. Therefore, it is possible to transmit the notification information to the peripheral apparatus 300-1 that the peripheral user who can easily respond to the talking request has. For example, there is a concern that a peripheral user who is not familiar with the destination user does not respond to the talking request if the peripheral user is requested to talk to the destination user. In addition, there is also a concern that the destination user who is talked by an unfamiliar peripheral user does not listen to the what the peripheral user is talking even if the peripheral user talks to the destination user. Meanwhile, it is possible to cause the destination user to more reliably be aware of the arrival of the delivered information by the peripheral user suitable for the destination user being selected.

In addition, the aforementioned information related to the peripheral apparatuses 300-1 includes information about the peripheral apparatuses 300-1. Here, it is important to cause the peripheral users to be aware of the notification information first in order to deliver the arrival of the delivered information to the destination user. Thus, it is possible to more reliably present the notification information to the peripheral users by the peripheral apparatuses 300-1 suitable for the reception of the notification information being selected on the basis of the information about the peripheral apparatuses 300-1.

In addition, the aforementioned information about the peripheral apparatuses 300-1 includes electric power information or apparatus type information. As for the electric power information, for example, there is a higher possibility that the notification information is successfully presented as the remaining amount of the battery increases. In addition, as for the apparatus type information, there is a higher possibility that the notification information is successfully presented as the peripheral apparatus 300-1 is an apparatus that further tends to cause the peripheral users to feel the presentation of the arrival of the notification information. Therefore, it is possible to more reliably present the notification information to the user of the peripheral apparatus 300-1 by the notification information being transmitted to such a peripheral apparatus 300-1.

2. SECOND EMBODIMENT OF THE PRESENT DISCLOSURE (EXAMPLE IN WHICH TRANSMISSION SOURCE APPARATUS MAINLY PERFORMS PROCESSING)

The first embodiment of the present disclosure has been described above. Next, a second embodiment of the present disclosure will be described. In the second embodiment, notification information is transmitted from a transmission source apparatus 100-2 to a peripheral apparatus 300-2 without a server 400.

2-1. Outline of System

Figure 8:
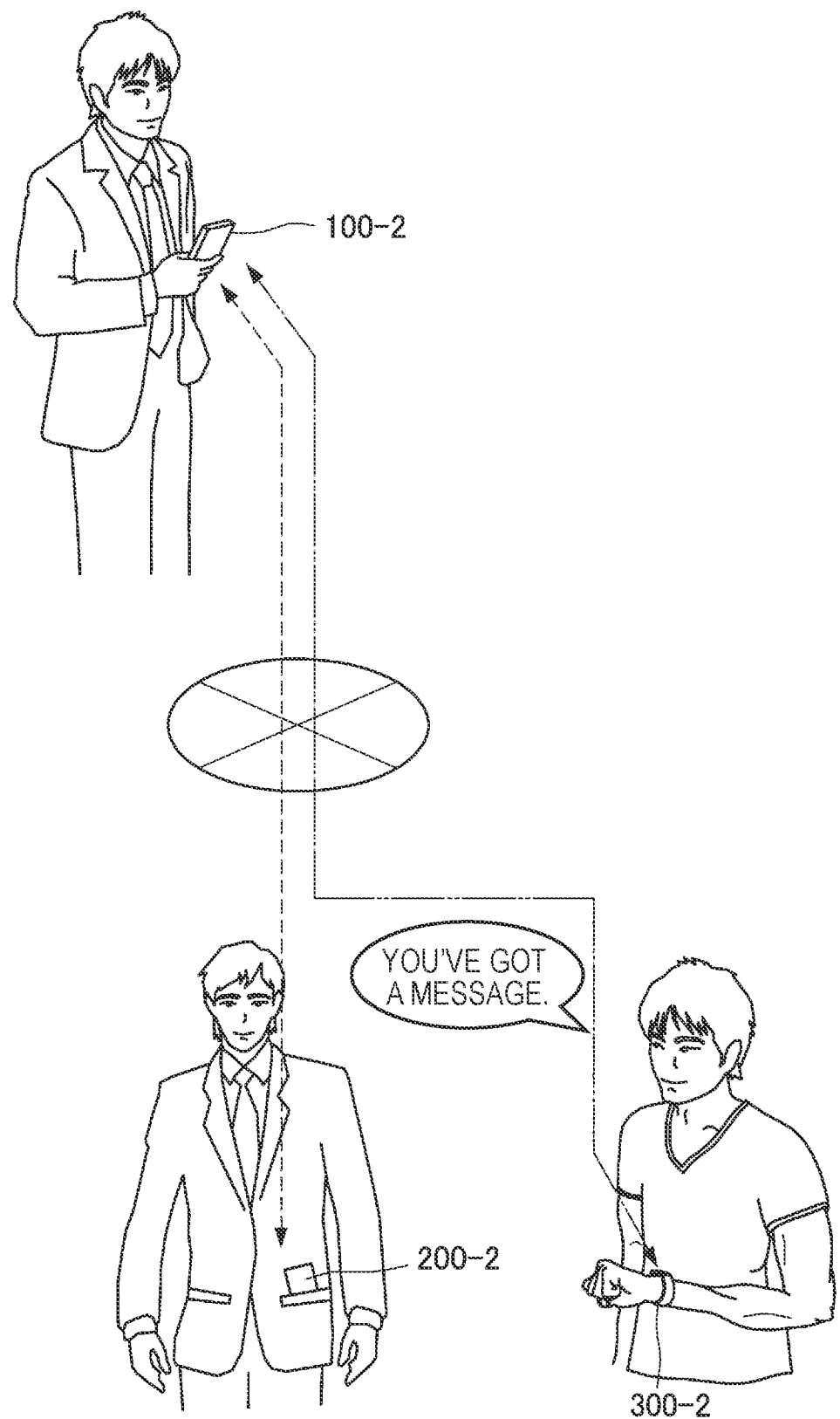
FIG. 8 is a diagram for describing an outline of an information processing system according to a second embodiment of the present disclosure.

First, an outline of an information processing system according to the second embodiment of the present disclosure will be described with reference to FIG. 8. FIG. 8 is a diagram for describing the outline of the information processing system according to the second embodiment of the present disclosure.

In the second embodiment of the present disclosure, the transmission source apparatus 100-2 transmits notification information directed to the peripheral apparatus 300-2 that is estimated to be located within a predetermined range from the destination apparatus 200-2 of delivered information on the basis of positional relationship information instead of the server 400.

In a case in which there is no reply to a message information after the transmission source apparatus 100-2 transmits the message information to the destination apparatus 200-2 as represented by the broken line in FIG. 8, for example, the transmission source apparatus 100-2 identifies the peripheral apparatus 300-2 on the basis of position information of the destination apparatus 200-2. Note that the position information of the destination apparatus 200-2 is acquired from the destination apparatus 200-2 as represented by the broken line in FIG. 8 while the position information of the peripheral apparatus 300-2 is acquired from the peripheral apparatus 300-2 as represented by the two-dotted chain line in FIG. 8.

If the peripheral apparatus 300-1 is identified, the transmission source apparatus 100-2 transmits notification information to the peripheral apparatus 300-2 as represented by the two-dotted chain line in FIG. 8. If the notification information is received by the peripheral apparatus 300-2, the user of the peripheral apparatus 300-2 encourages the destination user to check the message information on the basis of the notification information.

Hereinafter, details of the information processing system according to the embodiment will be described. Note that description of functions or processing that is substantially the same as the functions or the processing according to the first embodiment will be omitted.

2-2. Functional Configuration of System

Figure 9:
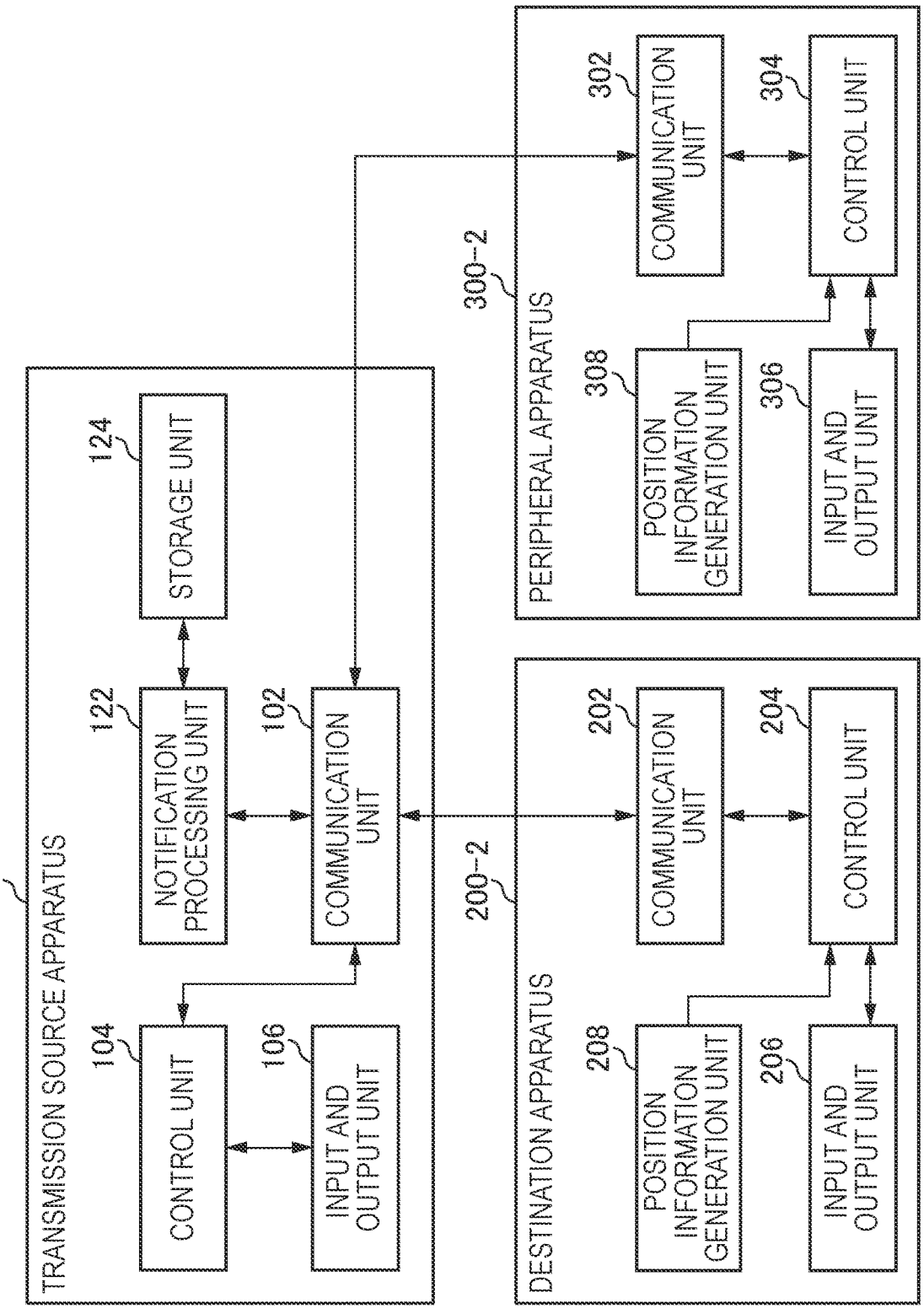
FIG. 9 is a block diagram schematically illustrating an example of a functional configuration of the information processing system according to the embodiment.

Next, a functional configuration of the information processing system according to the embodiment will be described with reference to FIG. 9. FIG. 9 is a block diagram schematically illustrating an example of the functional configuration of the information processing system according to the embodiment.

As illustrated in FIG. 9, the information processing system according to the embodiment includes the transmission source apparatus 100-2, the destination apparatus 200-2, and the peripheral apparatus 300-2. Note that only the transmission source apparatus 100-2 will be described since functions of the destination apparatus 200-2 and the peripheral apparatus 300-2 are substantially the same as those in the first embodiment other than that a response to the information transmission request transmitted from the transmission source apparatus 100-2 is performed.

(Transmission Source Apparatus)

As illustrated in FIG. 9, the transmission source apparatus 100-2 includes, as the information processing apparatus, a notification processing unit 122 and a storage unit 124 in addition to a communication unit 102, a control unit 104, and an input and output unit 106.

(Communication Unit)

The communication unit 102 communicates with the destination apparatus 200-2 and the peripheral apparatus 300-2. Specifically, the communication unit 102 transmits message information and an information transmission request to the destination apparatus 200-2 and receives positional relationship information from the destination apparatus 200-2. In addition, the communication unit 102 transmits the information transmission request and the notification information to the peripheral apparatus 300-2 and receives positional relationship information, information related to the peripheral apparatus 300-2, and response information from the peripheral apparatus 300-2.

(Control Unit)

If a predetermined period of time has elapsed after the transmission of the message information, the control unit 104 collects the position information of the destination apparatus 200-2 and the peripheral apparatus 300-2. Specifically, if a predetermined period of time has elapsed after the transmission of the message information, the control unit 104 generates an information transmission request for requesting the destination apparatus 200-2 to respond with position information. In addition, the control unit 104 generates an information transmission request directed to an apparatus identified from an address list stored in the storage unit 124. Then, the control unit 104 causes the communication unit 102 to transmit the generated information transmission request. Note that the position information received as a response to the information transmission request is stored in the storage unit 124.

(Notification Processing Unit)

The notification processing unit 122 generates notification information on the basis of positional relationship information. Note that description of the functions of the notification processing unit 122 will be omitted since they are substantially the same as the functions of the notification processing unit 404 other than that the notification processing unit 122 does not have communication processing related to selection of a destination of the notification information.

(Storage Unit)

The storage unit 124 stores information received from the destination apparatus 200-2 or the peripheral apparatus 300-2. For example, the storage unit 124 stores information about the destination apparatus 200-2 and the peripheral apparatus 300-2, such as position information, information about the destination user and the peripheral user, and the like.

2-3. Processing Performed by System

Figure 10:
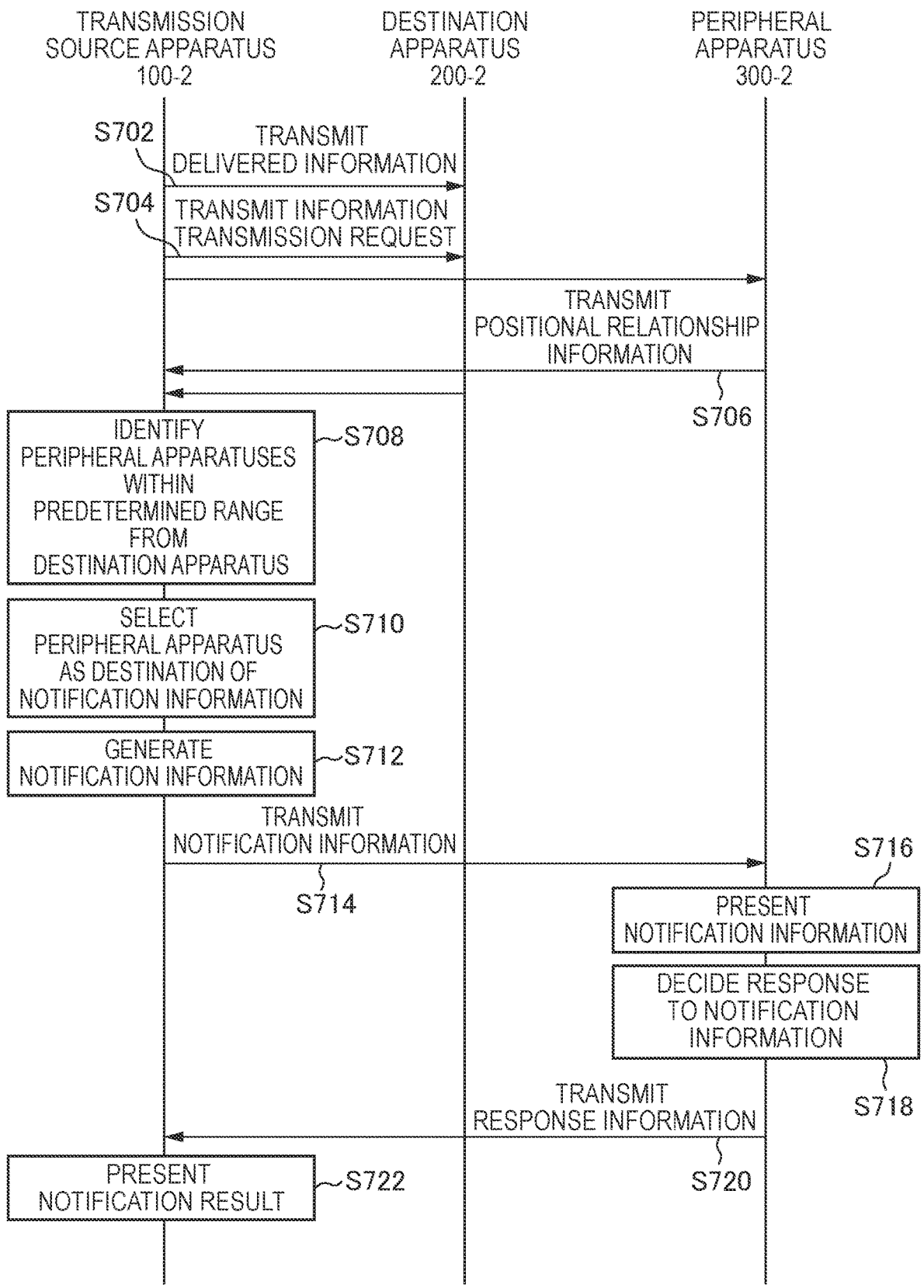
FIG. 10 is a sequence diagram conceptually illustrating an example of processing performed by the information processing system according to the embodiment.

Next, processing performed by the information processing system according to the embodiment will be described with reference to FIG. 10. FIG. 10 is a sequence diagram conceptually illustrating an example of the processing performed by the information processing system according to the embodiment.

First, the transmission source apparatus 100-2 transmits delivered information to the destination apparatus 200-2 (Step S702), and if a predetermined period of time has elapsed after the transmission of the delivered information, the transmission source apparatus 100-2 transmits an information transmission request to the destination apparatus 200-2 and the peripheral apparatus 300-2 (Step S704). Specifically, the control unit 104 generates an information transmission request if a predetermined time has elapsed after the transmission of the message information. Then, the generated information transmission request is transmitted to the destination apparatus 200-2 by the communication unit 102. In addition, the control unit 104 identifies apparatuses other than the destination apparatus 200-2 by using information from the address list or the like. Then, the generated information transmission request is transmitted to the identified apparatuses, that is, apparatuses as candidates of the peripheral apparatus 300-2. Note that the apparatuses as the candidates of the peripheral apparatus 300-2 may be narrowed down in the processing in this step.

The destination apparatus 200-2 and the peripheral apparatus 300-2 that have received the information transmission request transmits positional relationship information to the transmission source apparatus 100-2 (Step S706). Specifically, if the information transmission request is received, the control unit 204 causes the communication unit 202 to transmit the position information generated by the position information generation unit 208 to the transmission source apparatus 100-2. Note that the information related to the destination apparatus 200-2 may also be transmitted together or separately. Similarly, the position information or the like for the peripheral apparatus 300-2 is transmitted to the transmission source apparatus 100-2.

The transmission source apparatus 100-2 that has received the positional relationship information identifies the peripheral apparatuses 300-2 within a predetermined range from the destination apparatus 200-2 (Step S708) and selects the peripheral apparatus 300-2 as a destination of the notification information from the identified peripheral apparatuses 300-2 (Step S710). Specifically, the control unit 104 identifies the peripheral apparatuses 300-2 as candidates of the destination of the notification information, which are present within the predetermined range from the destination apparatus 200-2, on the basis of the received position information. Next, the control unit 104 causes the input and output unit 106 to display the information related to the identified peripheral apparatuses 300-1 and selects the peripheral apparatus 300-2 as the destination of the notification information on the basis of a selection operation input to the input and output unit 106.

Next, the transmission source apparatus 100-2 generates notification information (Step S712) and transmits the generated notification information to the peripheral apparatus 300-2 (Step S714). Specifically, if the peripheral apparatus 300-2 as the destination of the notification information is selected, the control unit 104 generates the notification information on the basis of attribute information of the message information. Then, the generated notification information is transmitted to the peripheral apparatus 300-2 by the communication unit 102.

The peripheral apparatus 300-2 that has received the notification information presents the notification information to the peripheral user (Step S716) and decides a response to the notification information (Step S718). Then, the peripheral apparatus 300-2 transmits response information to the transmission source apparatus 100-2 (Step S720).

The transmission source apparatus 100-2 that has received the response information presents notification result information to the transmission source user (Step S722). Specifically, if the response information is received, the control unit 104 generates the notification result information from the response information and causes the input and output unit 106 to display the generated notification result information.

2-4. Summary of Second Embodiment

According to the second embodiment of the present disclosure, the transmission source apparatus 100-2 transmits the notification information directed to the peripheral apparatus 300-2 that is estimated to be located within the predetermined range from the destination apparatus 200-2 of the delivered information on the basis of the positional relationship information in this manner. Therefore, it is possible to realize the talking request service without the server 400. Also, it is possible to save the communication (for example, communication of selection information or the like) as compared with the first embodiment by the processing of the talking request service being controlled by the transmission source apparatus 100-2 that is operate by a user who desires to use the talking request service. Therefore, it is possible to simplify the system configuration and to increase efficiency of the communication processing.

3. THIRD EMBODIMENT OF THE PRESENT DISCLOSURE (EXAMPLE IN WHICH DESTINATION APPARATUS MAINLY PERFORMS PROCESSING)

The second embodiment of the present disclosure has been described above. Next, a third embodiment of the present disclosure will be described. In the third embodiment, notification information is transmitted from a destination apparatus 200-3 to a peripheral apparatus 300-3 without a server 400.

3-1. Outline of System

Figure 11:
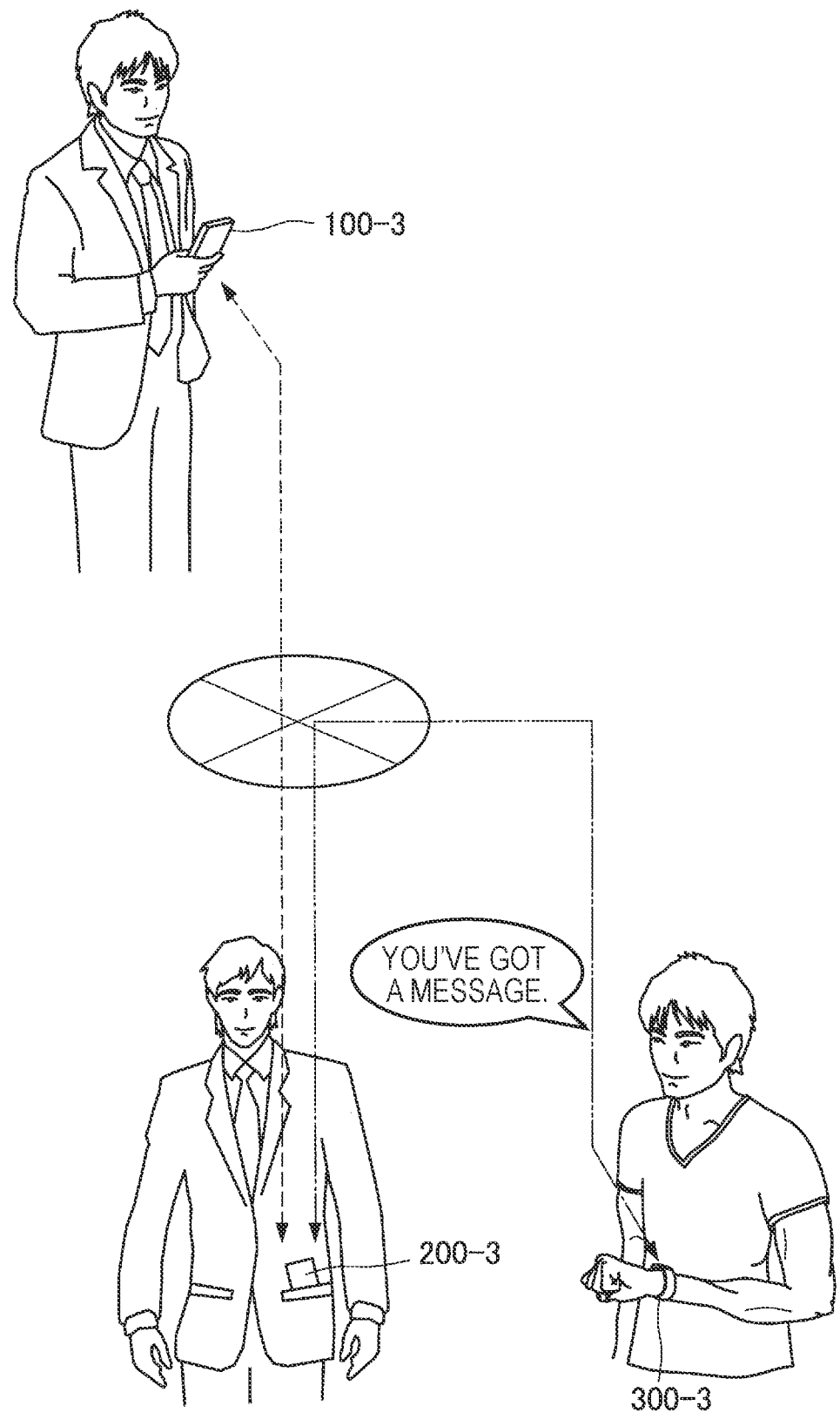
FIG. 11 is a diagram for describing an outline of an information processing system according to a third embodiment of the present disclosure.

First, an outline of an information processing system according to the third embodiment will be described with reference to FIG. 11. FIG. 11 is a diagram for describing the outline of the information processing system according to the third embodiment of the present disclosure.

In the third embodiment of the present disclosure, the destination apparatus 200-3 receives delivered information and transmits notification information directed to peripheral apparatus 300-3 that is estimated to be located within a predetermined range from the destination apparatus 200-3 itself on the basis of positional relationship information instead of the server 400 and the transmission source apparatus 100.

In a case in which there is no reply to a message information after the message information is transmitted from a transmission source apparatus 100-3 to a destination apparatus 200-3 as represented by the broken line in FIG. 11, the destination apparatus 200-3 identifies the peripheral apparatus 300-3 on the basis of the position information of the destination apparatus 200-3 itself. Note that the position information of the peripheral apparatus 300-3 is acquired from the peripheral apparatus 300-3 as represented by the two-dotted chain line in FIG. 11.

If the peripheral apparatus 300-3 is identified, the destination apparatus 200-3 transmits notification information to the peripheral apparatus 300-3 as represented by the two-dotted chain line in FIG. 11. If the notification information is received by the peripheral apparatus 300-3, a user of the peripheral apparatus 300-3 encourage a destination user to check the message information on the basis of the notification information.

Hereinafter, details of the information processing system according to the embodiment will be described. Note that descriptions of functions or processing that is substantially the same as the functions or the processing according to the first or second embodiment will be omitted.

3-2. Functional Configuration of System

Figure 12:
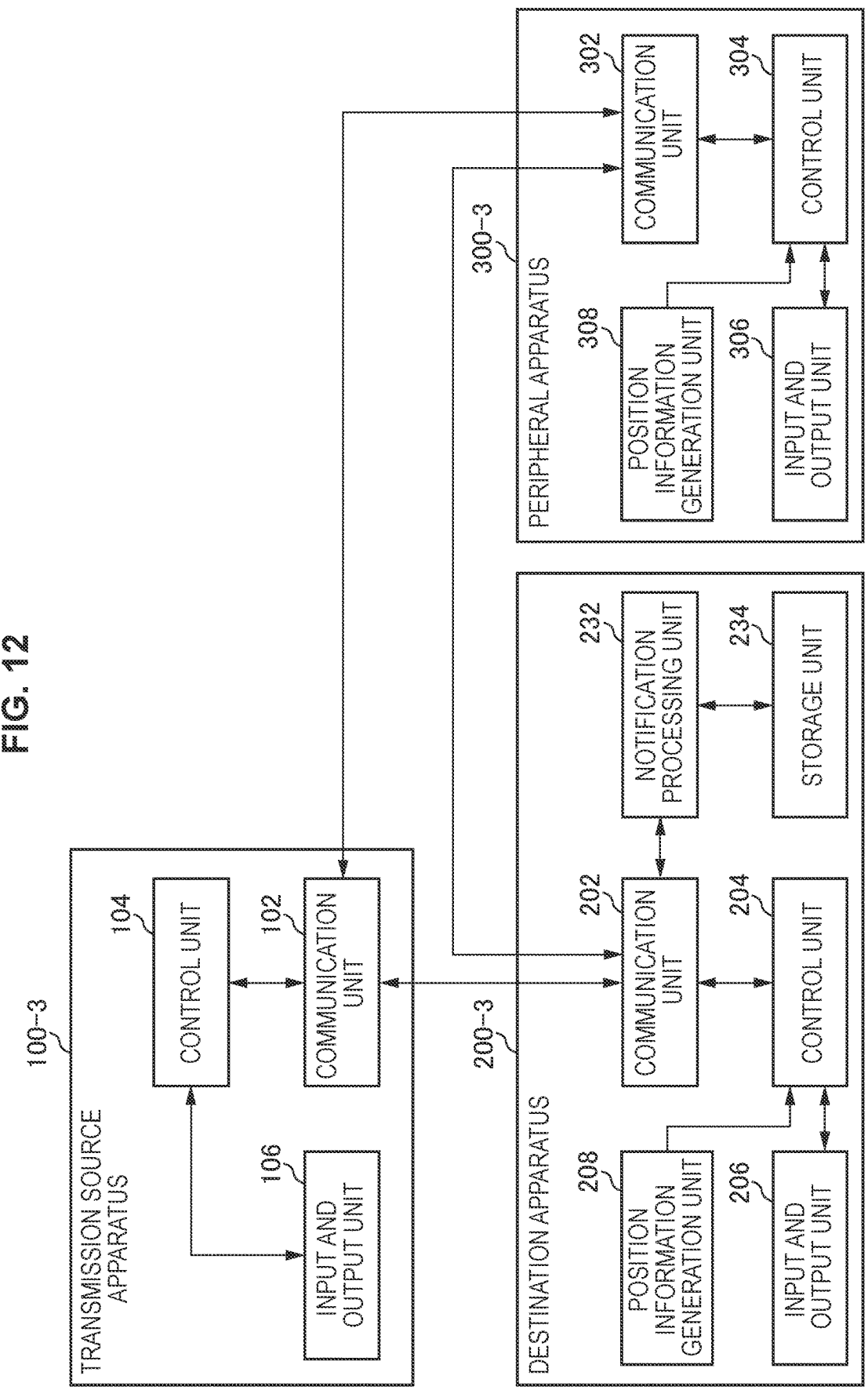
FIG. 12 is a block diagram schematically illustrating an example of a functional configuration of the information processing system according to the embodiment.

Next, a functional configuration of the information processing system according to the embodiment will be described with reference to FIG. 12. FIG. 12 is a block diagram schematically illustrating an example of the functional configuration of the information processing system according to the embodiment.

As illustrated in FIG. 12, the information processing system according to the embodiment includes the transmission source apparatus 100-3, the destination apparatus 200-3, and the peripheral apparatus 300-3. Note that only the destination apparatus 200-3 will be described since functions of the transmission source apparatus 100-3 are substantially the same as those in the first embodiment and functions of the peripheral apparatus 300-3 are substantially the same as those in the second embodiment.

(Destination Apparatus)

As illustrated in FIG. 12, the destination apparatus 200-3 includes, as the information processing apparatus, a notification processing unit 232 and a storage unit 234 in addition to a communication unit 202, a control unit 204, an input and output unit 206, and a position information generation unit 208.

(Communication Unit)

The communication unit 202 communicates with the transmission source apparatus 100-3 and the peripheral apparatus 300-3. Specifically, the communication unit 202 transmits information related to the peripheral apparatus 300-3 and notification result information to the transmission source apparatus 100-3 and receives message information and selection information of the peripheral apparatus 300-3 from the transmission source apparatus 100-3. Also, the communication unit 202 transmits an information transmission request and notification information to the peripheral apparatus 300-3 and receives positional relationship information, information related to the peripheral apparatus 300-3, and response information from the peripheral apparatus 300-3.

(Control Unit)

If a predetermined period of time has elapsed after the reception of the message information, the control unit 204 collects the position information of the peripheral apparatus 300-3. Specifically, the control unit 204 generates an information transmission request directed to an apparatus identified from an address list or the like stored in the storage unit 234 if the predetermined period of time has elapsed after the reception of the message information. Then, the control unit 204 causes the communication unit 202 to transmit the generated information transmission request. Note that the position information received as a response to the information transmission request is stored in the storage unit 234. In addition, if a predetermined time has elapsed after the reception of the message information, the control unit 204 acquires the position information from the position information generation unit 208.

(Notification Processing Unit)

The notification processing unit 232 generates notification information on the basis of positional relationship information. Note that description of functions of the notification processing unit 232 will be omitted since they are substantially the same as the functions of the notification processing unit 404.

(Storage Unit)

The storage unit 234 stores information received from the transmission source apparatus 100-3 or the peripheral apparatus 300-3. For example, the storage unit 234 stores information about the peripheral apparatus 300-3, such as the message information and the position information, information about the peripheral user, and the like.

3-3. Processing Performed by System

Figure 13:
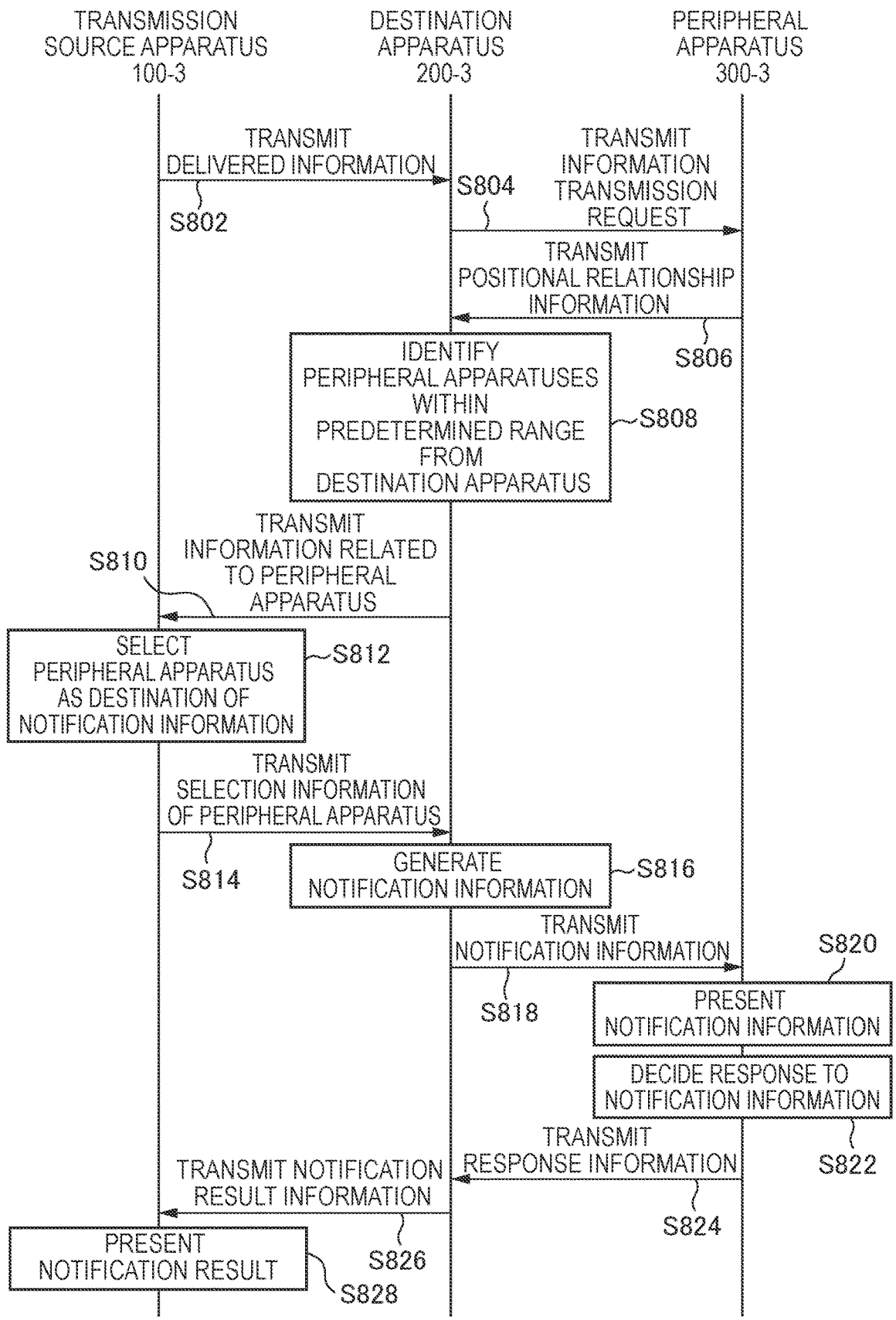
FIG. 13 is a sequence diagram conceptually illustrating an example of processing performed by the information processing system according to the embodiment.

Next, processing performed by the information processing system according to the embodiment will be described with reference to FIG. 13. FIG. 13 is a sequence diagram conceptually illustrating an example of processing performed by the information processing system according to the embodiment.

The transmission source apparatus 100-3 transmits delivered information to the destination apparatus 200-3 (Step S802), and if a predetermined period of time has elapsed after the reception of the delivered information, the destination apparatus 200-3 transmits an information transmission request to the peripheral apparatus 300-3 (Step S804). Specifically, if the predetermined period of time has elapsed after the reception of the message information, the control unit 204 identifies an apparatus other than the transmission source apparatus 100-3 by using information in an address list or the like. Then, the generated information transmission request is transmitted to the identified apparatus.

The peripheral apparatus 300-3 that has received the information transmission request transmits positional relationship information to the destination apparatus 200-3 (Step S806).

The destination apparatus 200-3 that has received the positional relationship information identifies peripheral apparatuses 300-3 within a predetermined range from the destination apparatus 200-3 itself (Step S808) and transmits information related to the identified peripheral apparatuses 300-3 to the transmission source apparatus 100-3 (Step S810). Specifically, the communication unit 202 receives the position information and the information related to the peripheral apparatuses 300-3. The control unit 204 identifies the peripheral apparatuses 300-3 as candidates of the destination of the notification information, which are present within a predetermined range from the destination apparatus 200-3, on the basis of the received position information. Then, the control unit 204 causes the communication unit 202 to transmit the received information related to the peripheral apparatuses 300-3 to the transmission source apparatus 100-3 for the identified peripheral apparatuses 300-3.

The transmission source apparatus 100-3 that has received the information related to the peripheral apparatuses 300-3 selects a peripheral apparatus 300-3 as a destination of the notification information (Step S812) and transmits selection information of the peripheral apparatus 300-3 to the destination apparatus 200-3 (Step S814).

The destination apparatus 200-3 that has received the selection information of the peripheral apparatus 300-3 generates notification information (Step S816) and transmits the generated notification information to the peripheral apparatus 300-3 (Step S818). Specifically, if the selection information of the peripheral apparatus 300-3 is received, the control unit 204 generates the notification information on the basis of attribute information of the message information for the peripheral apparatus 300-3 indicated by the selection information. Then, the generated notification information is transmitted to the peripheral apparatus 300-3 by the communication unit 202.

The peripheral apparatus 300-3 that has received the notification information presents the notification information to the peripheral user (Step S820) and decides a response to the notification information (Step S822). Then, the peripheral apparatus 300-3 transmits response information to the destination apparatus 200-3 (Step S824).

The destination apparatus 200-3 that has received the response information transmits notification result information to the transmission source apparatus 100-3 (Step S826), and if the notification result information is received, the transmission source apparatus 100-3 presents the notification result information to the transmission source user (Step S828).

3-4. Summary of Third Embodiment

According to the third embodiment of the present disclosure, the destination apparatus 200-3 receives the delivered information and transmits the notification information directed to the peripheral apparatus 300-3 that is estimated to be located within the predetermined range from the destination apparatus 200-3 itself on the basis of the positional relationship information. Therefore, it is possible to realize the talking request service without the server 400. Therefore, it is possible to simplify the system configuration. Also, it is possible to select the peripheral apparatus 300-3 that can make a contact with the destination apparatus 200-3 as the destination of the notification information. Therefore, the possibility that the peripheral user is acquainted with the destination user increases, and it is possible to suppress the concern that the talking request is failed.

4. HARDWARE CONFIGURATION OF INFORMATION PROCESSING APPARATUS ACCORDING TO ONE EMBODIMENT OF THE PRESENT DISCLOSURE

The server 400, the transmission source apparatus 100, the destination apparatus 200 as the information processing apparatus according to each embodiment of the present disclosure (hereinafter, collectively referred to as an information processing apparatus 900) has been described above. The aforementioned processing of the information processing apparatus 900 is realized by cooperation of software and hardware of the information processing apparatus 900, which will be described below.

Figure 14:
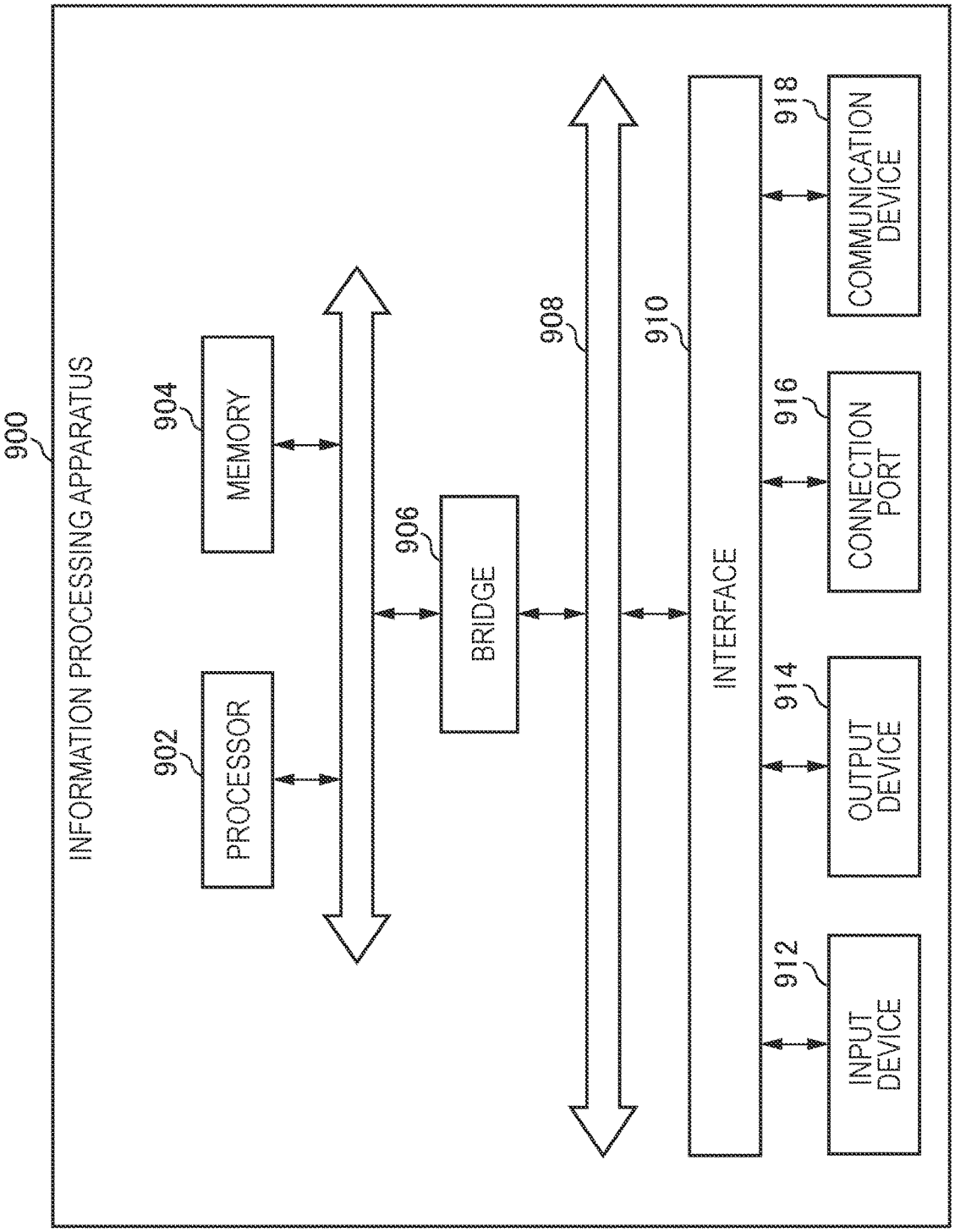
FIG. 14 is an explanatory diagram illustrating a hardware configuration of an information processing apparatus according to an embodiment of the present disclosure.

FIG. 14 is an explanatory diagram illustrating a hardware configuration of the information processing apparatus 900 according to an embodiment of the present disclosure. As illustrated in FIG. 14, the information processing apparatus 900 includes a processor 902, a memory 904, a bridge 906, a bus 908, an interface 910, an input device 912, an output device 914, a connection port 916, and a communication device 918.

(Processor)

The processor 902 functions as an arithmetic processing device and realizes the functions of the control unit and the notification processing unit in the information processing apparatus 900 in cooperation with various programs. The processor 902 causes a variety of logical functions of the information processing apparatus 900 to operate by executing the programs stored in the memory 904 or another storage medium by using a control circuit. For example, the processor 902 can be a central processing unit (CPU), a graphics processing unit (GPU), a digital signal processor (DSP), or a system-on-a-chip (SoC).

(Memory)

The memory 904 stores programs, arithmetic parameters, or the like that are used by the processor 902. For example, the memory 904 includes a random access memory (RAM) and temporarily stores programs that are used by being executed by the processor 902 or parameters and the like that are appropriately changed in the execution. In addition, the memory 904 includes a read only memory (ROM), and the RAM and the ROM realize the functions of the storage unit. Note that an external storage device may be utilizes as a part of the memory 904 via the connection port 916, the communication device 918, or the like.

Note that the processor 902 and the memory 904 are connected to each other by an internal bus that includes a CPU bus or the like.

(Bridge and Bus)

The bridge 906 establishes connection between the buses. Specifically, the bridge 906 connects the internal bus to which the processor 902 and the memory 904 are connected and the bus to which the interface 910 is connected.

(Input Device)

The input device 912 is used by the user to operate the information processing apparatus 900 or to input information to the information processing apparatus 900 and realizes the functions of the input and output unit and the position information generation unit. For example, the input device 912 includes an input means for the user inputting information, an input control circuit that generates an input signal on the basis of the input by the user and outputs the input signal to the processor 902, and the like. Note that the input means may be a mouse, a keyboard, a touch panel, a switch, a lever, a microphone, or the like. The user of the information processing apparatus 900 can input various kinds of data or provide instructions for processing operations to the information processing apparatus 900 by operating the input device 912. In addition, input signals from an inertial sensor, a GPS sensor, or the like may be received, and the received input signals may be output to the processor 902.

(Output Device)

The output device 914 is used to notify the user of information and realizes the functions of the input and output unit. The output device 914 may be a display device or a sound output device. For example, the output device 914 may be an apparatus such as a liquid crystal display (LCD) device, an organic light emitting diode (OLED) device, a projector, a speaker, or a headphone or a module that provides outputs to such an apparatus.

Note that the input device 912 or the output device 914 may include an input and output device. For example, the input and output device may be a touch screen.

(Connection Port)

The connection port 916 is a port for connecting equipment directly to the information processing apparatus 900. For example, the connection port 916 can be a universal serial bus (USB) port, an IEEE1394 port, a small computer system interface (SCSI) port, or the like. Alternatively, the connection port 916 may be an RS-232C port, an optical audio terminal, a High-Definition Multimedia Interface (HDMI) (registered trademark) port, or the like. Data may be exchanged between the information processing apparatus 900 and the external equipment by connecting the external equipment to the connection port 916.

(Communication Device)

The communication device 918 intermediates communication between the information processing apparatus 900 and an external device and realizes the functions of the communication unit. Specifically, the communication device 918 executes communication in accordance with a wireless communication scheme or a wired communication scheme. For example, the communication device 918 executes wireless communication in accordance with a cellular communication scheme such as Wideband Code Division Multiple Access (WCDMA) (registered trademark), WiMAX (registered trademark), long term evaluation (LTE), or LTE-A. Note that the communication device 918 may execute wireless communication in accordance with an arbitrary wireless communication scheme such as a near-field wireless communication scheme such as Bluetooth (registered trademark), near field communication (NFC), a wireless USB, or a TransferJet (registered trademark) or a wireless local area network (LAN) such as Wi-Fi (registered trademark). In addition, the communication device 918 executes wired communication such as signal line communication or wired LAN communication.

Note that the information processing apparatus 900 may not have a part of the configuration described above with reference to FIG. 14 or may have an arbitrary additional configuration. In addition, a one-chip information processing module on which an entirety or a part of the configuration described above with reference to FIG. 14 is integrated may be provided.

5. CONCLUSION

According to the first embodiment of the present disclosure, it is possible to transmit the notification information from the server 400 to the peripheral apparatus 300-1 without mediation of the destination apparatus 200-1 as described above. In addition, it is possible to request the peripheral apparatus 30-1 to talk even if the transmission source apparatus 100-1 does not ascertain the contact information of the peripheral apparatus 300-1, by the notification information being transmitted from the server 400. Therefore, it is possible to cause the user of the destination apparatus 200-1 to be aware of the arrival of the delivered information without the destination apparatus 200-1 communicating directly with the peripheral apparatus 300-1.

In addition, according to the second embodiment of the present disclosure, it is possible to realize the talking request service without the server 400. Also, it is possible to save communication (for example, communication of selection information or the like) as compared with the first embodiment by the processing of the talking request service being controlled by the transmission source apparatus 100-2 that is operated by the user who desires to use the talking request service. Therefore, it is possible to simplify the system configuration and to increase efficiency of the communication processing.

In addition, according to the third embodiment of the present disclosure, it is possible to realize the talking request service without the server 400. Therefore, it is possible to simplify the system configuration. In addition, it is possible to select the peripheral apparatus 300-3 that can make a contact with the destination apparatus 200-3 as the destination of the notification information. Therefore, the possibility that the peripheral user is acquainted with the destination user increases, and it is possible to suppress the concern that the talking request is failed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although whether or not to transmit the notification information is selected by a user's operation in the transmission source apparatus 100 in the aforementioned embodiments, the present technology is not limited to such an example. For example, whether or not to transmit the notification information may be set in advance by the user. In this case, it is possible to utilize the talking request service in accordance with intension of the transmission source user while omitting the selection operation. Also, whether or not to transmit the notification information may be set by the destination apparatus 200.

In addition, although the example in which the peripheral apparatus 300 is an apparatus that is owned by the user who is different from the destination user has been described in the aforementioned embodiments, the peripheral apparatus 300 may be an apparatus that is owned by the destination user. For example, in a case in which the destination apparatus 200 is a smartphone put in a bag or the like of the destination user while the peripheral apparatus 300 is a wearable terminal that the destination user is wearing, the destination user can recognize that there has been arrival of message information or a phone call in the smartphone of the destination user himself/herself through the wearable terminal.

In addition, although the example in which the peripheral users are individuals has been described in the aforementioned embodiments, the peripheral users may be cooperation entities. For example, the peripheral apparatus 300 may be a stationary telephone provided in a shop such as a restaurant.

In addition, although the example in which the positional relationship information of the destination apparatus 200 is provided in response to a request from the server 400 or the transmission source apparatus 100, at predetermined time intervals, or the like has been described in the aforementioned embodiments, the positional relationship information may be provided on the basis of intension of the destination user. If the destination user expects that the destination apparatus 200 will become not able to communicate due to a decrease in the battery remaining amount of the destination apparatus 200 or the like, for example, the destination user inputs an instruction for transmitting the positional relationship information to the destination apparatus 200. If the instruction for transmitting the positional relationship information is input, the destination apparatus 200 transmits the positional relationship information to the server 400 or the transmission source apparatus 100. Therefore, even if it becomes not possible for the destination apparatus 200 to communicate thereafter, the destination user can ascertain the arrival of the delivered information by being talked to by the peripheral user. Further, in a case in which the positional relationship information is provided on the basis of intension of the destination user, the content of the delivered information may be added to the notification information or may be provided separately. In this manner, it is possible for the destination user to hear about the delivered information from the peripheral user even when the delivered information cannot be checked by the destination apparatus 200.

In addition, although the example in which the information processing system is utilized in ordinary situations has been described in the aforementioned embodiments, the information processing system may be utilized in emergency situations. In a case in which a disaster or an accident has occurred, and when it is not possible to make a contact from a person who is concerned with the destination user to the destination user, for example, a talking request may be provided to the peripheral user of the destination user through the information processing system. In addition, the peripheral user may notify the person who is concerned of a message left by the destination user by using the peripheral apparatus 300.

In addition, although the example in which the information about the peripheral apparatus 300 is displayed by the input and output unit 106 has been described in the aforementioned embodiments, the information may be presented to the user in another form. For example, the input and output unit 106 may present the peripheral apparatus 300 to the user by outputting sound.

In addition, although the example in which the operation of generating the message information and the operation of selecting the peripheral apparatus 300 are performed by touch inputs has been described in the aforementioned embodiments, these operations may be performed by sound inputs.

Further, the effects described in this specification are merely illustrative or exemplified effects, and are not limitative. That is, with or in the place of the above effects, the technology according to the present disclosure may achieve other effects that are clear to those skilled in the art from the description of this specification.

In addition, the steps illustrated in the flowcharts in the aforementioned embodiments include processing that is performed in a time series manner along the described order, of course, and also includes processing that is not necessarily performed in the time series manner but is executed in parallel or individually. Also, it is needless to say that the orders of the steps that are performed in the time series manner can also appropriately be changed depending on situations.

In addition, it is also possible to produce a computer program for causing hardware incorporated in the transmission source apparatus 100, the destination apparatus 200, and the server 400 to exhibit functions that are equivalent to those of the aforementioned respective functional configurations of the transmission source apparatus 100 the destination apparatus 200, and the server 400. In addition, a storage medium with the computer program stored therein is also provided.

Additionally, the present technology may also be configured as below.

(1)

An information processing apparatus including:

a notification processing unit that generates notification information for causing a user of a destination apparatus to be aware of arrival of delivered information, which is directed to a peripheral apparatus that is estimated to be located within a predetermined range from the destination apparatus of the delivered information on a basis of positional relationship information; and a communication unit that transmits the notification information generated by the notification processing unit.

(2)
The information processing apparatus according to (1), in which the delivered information includes message information or calling information for a phone call.

(3)
The information processing apparatus according to (1) or (2), in which the positional relationship information includes position information related to estimated positions of the destination apparatus and the peripheral apparatus.

(4)
The information processing apparatus according to (3), in which the position information includes position information estimated from movement histories of the apparatuses.

(5)
The information processing apparatus according to any one of (1) to (4), in which the positional relationship information includes information with which the peripheral apparatus that stays with a user of the destination apparatus is identified.

(6)
The information processing apparatus according to any one of (1) to (5), in which the notification information has information related to a user of the destination apparatus or at least a part of the delivered information.

(7)
The information processing apparatus according to any one of (1) to (6), in which content of the notification information is decided on a basis of attribute information of the delivered information.

(8)
The information processing apparatus according to any one of (1) to (7), in which the notification information has a request for responding to the notification information, and the communication unit receives a response based on the request for responding.

(9)
The information processing apparatus according to any one of (1) to (8), in which a destination of the notification information includes some peripheral apparatuses selected from a plurality of the peripheral apparatuses.

(10)
The information processing apparatus according to (9), in which the information processing apparatus includes a transmission source apparatus of the delivered information, the information processing apparatus further includes a detection unit that detects operations performed on the transmission source apparatus, and the some peripheral apparatuses are selected on a basis of the operations detected by the detection unit.

(11)
The information processing apparatus according to (10), further including: a presenting unit that presents information related to the peripheral apparatuses to a user of the transmission source apparatus.

(12)
The information processing apparatus according to (11), in which a range of the information related to the peripheral apparatuses presented to the user of the transmission source apparatus is decided on a basis of a relationship between the user of the transmission source apparatus and users of the peripheral apparatuses.

(13)
The information processing apparatus according to (9), in which the some peripheral apparatuses are selected on a basis of the information related to the peripheral apparatuses.

(14)
The information processing apparatus according to (13), in which the information related to the peripheral apparatuses includes information about the users of the peripheral apparatuses.

(15)
The information processing apparatus according to (13) or (14), in which the information related to the peripheral apparatuses includes information about the peripheral apparatuses.

(16)
The information processing apparatus according to (15), in which the information about the peripheral apparatuses includes electric power information or apparatus type information.

(17)
The information processing apparatus according to any one of (1) to (16), in which the notification information is transmitted after elapse of a predetermined time from transmission of the delivered information.

(18)
An information processing method including, by a processor:
generating notification information for causing a user of a destination apparatus to be aware of arrival of delivered information, which is directed to a peripheral apparatus that is estimated to be located within a predetermined range from the destination apparatus of the delivered information on a basis of positional relationship information; and
transmitting the generated notification information.

(19)
A program that causes a computer to achieve:
a notification processing function of generating notification information for causing a user of a destination apparatus to be aware of arrival of delivered information, which is directed to a peripheral apparatus that is estimated to be located within a predetermined range from the destination apparatus of the delivered information on a basis of positional relationship information; and
a communication function of transmitting the notification information generated by the notification processing function.

(20)
An information processing system including:
a transmission source apparatus that transmits delivered information to a destination apparatus and transmits at least some of the delivered information to a server; and
a server that generates notification information for causing a user of the destination apparatus to be aware of arrival of delivered information, which is directed to a peripheral apparatus that is estimated to be located within a predetermined range from the destination apparatus on a basis of positional relationship information, and transmits the generated notification information.

REFERENCE SIGNS LIST

100 transmission source apparatus
102, 202, 302, 402 communication unit
104, 204, 304, 404 control unit
106, 206, 306 input and output unit
122, 232, 404 notification processing unit 124, 234, 406 storage unit
200 destination apparatus
208, 308 position information generation unit
300 peripheral apparatus
400 server

The invention claimed is:

1. An information processing apparatus comprising:
a notification processing unit configured to generate notification information for causing a user of a destination apparatus to be aware of arrival of delivered information, wherein the notification information is directed to a selected peripheral apparatus that is estimated to be located within a predetermined range from the destination apparatus of the delivered information, and wherein the estimation is made based on positional relationship information; and
a communication unit configured to transmit the notification information generated by the notification processing unit,
wherein the positional relationship information includes position information indicating estimated positions of the destination apparatus and the selected peripheral apparatus,
wherein the estimated positions of the destination apparatus and the selected peripheral apparatus are estimated based on a period of time and respective movement speeds of the destination apparatus and the selected peripheral apparatus, and
wherein the notification processing unit and the communication unit are each implemented via at least one processor.

2. The information processing apparatus according to claim 1, wherein the delivered information includes message information or calling information for a phone call.

3. The information processing apparatus according to claim 1, wherein the estimated positions are further estimated from respective movement histories of the destination apparatus and the selected peripheral apparatus.

4. The information processing apparatus according to claim 1, wherein the positional relationship information includes information with which the selected peripheral apparatus that stays with the user of the destination apparatus is identified.

5. The information processing apparatus according to claim 1, wherein the notification information has information related to the user of the destination apparatus or at least a part of the delivered information.

6. The information processing apparatus according to claim 1, wherein content of the notification information is decided based on attribute information of the delivered information.

7. The information processing apparatus according to claim 1,
wherein the notification information has a request for responding to the notification information, and
wherein the communication unit receives a response based on the request for responding.

8. The information processing apparatus according to claim 1, wherein a destination of the notification information includes selected peripheral apparatuses selected from a plurality of peripheral apparatuses.

9. The information processing apparatus according to claim 8,
wherein the information processing apparatus includes a transmission source apparatus of the delivered information,
wherein the information processing apparatus further comprises a detection unit configured to detect operations performed on the transmission source apparatus,
wherein the selected peripheral apparatuses are selected based on the operations detected by the detection unit, and
wherein the transmission source apparatus and the detection unit are each implemented via at least one processor.

10. The information processing apparatus according to claim 9, further comprising:
a presenting unit configured to present information related to the selected peripheral apparatuses to a user of the transmission source apparatus,
wherein the presenting unit is implemented via at least one display.

11. The information processing apparatus according to claim 10, wherein a range of the information related to the selected peripheral apparatuses presented to the user of the transmission source apparatus is decided based on a relationship between the user of the transmission source apparatus and users of the selected peripheral apparatuses.

12. The information processing apparatus according to claim 8, wherein the selected peripheral apparatuses are selected based on the information related to the selected peripheral apparatuses.

13. The information processing apparatus according to claim 12, wherein the information related to the selected peripheral apparatuses includes information about users of the selected peripheral apparatuses.

14. The information processing apparatus according to claim 12, wherein the information related to the selected peripheral apparatuses includes information about the selected peripheral apparatuses.

15. The information processing apparatus according to claim 14, wherein the information about the selected peripheral apparatuses includes electric power information or apparatus type information.

16. The information processing apparatus according to claim 1, wherein the notification information is transmitted after elapse of a predetermined time from transmission of the delivered information.

17. An information processing method comprising, by a processor:
generating notification information for causing a user of a destination apparatus to be aware of arrival of delivered information, wherein the notification information is directed to a peripheral apparatus that is estimated to be located within a predetermined range from the destination apparatus of the delivered information, and wherein the estimation is made based on positional relationship information; and
transmitting the generated notification information,
wherein the positional relationship information includes position information indicating estimated positions of the destination apparatus and the selected peripheral apparatus, and
wherein the estimated positions of the destination apparatus and the selected peripheral apparatus are estimated based on a period of time and respective movement speeds of the destination apparatus and the selected peripheral apparatus.

18. A non-transitory computer-readable storage medium having embodied thereon a program, which when executed by a computer causes the computer to execute a method, the method comprising:

generating notification information for causing a user of a destination apparatus to be aware of arrival of delivered information, wherein the notification information is directed to a peripheral apparatus that is estimated to be located within a predetermined range from the destination apparatus of the delivered information, and wherein the estimation is made based on positional relationship information; and transmitting the generated notification information, wherein the positional relationship information includes position information indicating estimated positions of the destination apparatus and the selected peripheral apparatus, and wherein the estimated positions of the destination apparatus and the selected peripheral apparatus are estimated based on a period of time and respective movement speeds of the destination apparatus and the selected peripheral apparatus.

19. An information processing system comprising:

a transmission source apparatus configured to
 transmit delivered information to a destination apparatus, and
 transmit at least some of the delivered information to a server; and a server configured to
 generate notification information for causing a user of the destination apparatus to be aware of arrival of delivered information, wherein the notification information is directed to a peripheral apparatus that is estimated to be located within a predetermined range from the destination apparatus, and wherein the estimation is made based on positional relationship information, and
 transmit the generated notification information, wherein the positional relationship information includes position information indicating estimated positions of the destination apparatus and the selected peripheral apparatus, wherein the estimated positions of the destination apparatus and the selected peripheral apparatus are estimated based on a period of time and respective movement speeds of the destination apparatus and the selected peripheral apparatus, and wherein the transmission source apparatus and the server are each implemented via at least one processor.

20. The information processing apparatus according to claim 1, wherein the selected peripheral apparatus is selected from a plurality of peripheral apparatuses based on information related to the plurality of peripheral apparatuses including attribute information of a user of each peripheral apparatus.

* * * * *